United States Patent
Gao

(10) Patent No.: US 12,126,452 B2
(45) Date of Patent: Oct. 22, 2024

(54) TRANSMISSION METHOD, TERMINAL AND NETWORK DEVICE

(71) Applicant: DATANG MOBILE COMMUNICATIONS EQUIPMENT CO., LTD., Beijing (CN)

(72) Inventor: Xuejuan Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 18/327,394

(22) Filed: Jun. 1, 2023

(65) Prior Publication Data

US 2023/0318752 A1 Oct. 5, 2023

Related U.S. Application Data

(63) Continuation of application No. 17/431,001, filed as application No. PCT/CN2020/071917 on Jan. 14, 2020, now abandoned.

(30) Foreign Application Priority Data

Feb. 15, 2019 (CN) .......................... 201910118050.2

(51) Int. Cl.
*H04W 72/21* (2023.01)
*H04L 1/1829* (2023.01)
(Continued)

(52) U.S. Cl.
CPC .......... *H04L 1/1854* (2013.01); *H04L 5/0055* (2013.01); *H04W 72/0446* (2013.01);
(Continued)

(58) Field of Classification Search
CPC ......... H04W 72/0413; H04W 72/0446; H04W 72/125
See application file for complete search history.

(56) References Cited

U.S. PATENT DOCUMENTS 10,123,306 B2    11/2018  Yang et al.
2016/0226649 A1   8/2016  Papasakellariou et al.
(Continued)

FOREIGN PATENT DOCUMENTS

CN    108271262 A    7/2018
CN    108632966 A   10/2018
(Continued)

OTHER PUBLICATIONS

Ericsson, "R1-1814193,Maintenance Issues on UCI Multiplexing on PUCCH", 3GPP TSG-RAN WG1 Meeting #95,2018? 11? 15? (Nov. 15, 2018).

(Continued)

*Primary Examiner* — Bo Hui A Zhu
(74) *Attorney, Agent, or Firm* — Harness, Dickey & Pierce, P.L.C.

(57) ABSTRACT

The present disclosure provides a transmission method, a terminal and a network device. The transmission method includes: when at least one of at least two PUCCHs carrying an HARQ-ACK in one time unit overlaps with a PUCCH carrying target UCI in the time unit, determining a second PUCCH; and transmitting target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, transmitting the target information in accordance with a predetermined rule. The target information is the HARQ-ACK carried in the at least one PUCCH and the target UCI, or the HARQ-ACK carried in the at least one PUCCH.

20 Claims, 7 Drawing Sheets

(51) Int. Cl.
*H04L 5/00* (2006.01)
*H04W 72/0446* (2023.01)
*H04W 72/50* (2023.01)
*H04L 1/1812* (2023.01)

(52) U.S. Cl.
CPC ......... *H04W 72/21* (2023.01); *H04W 72/535* (2023.01); *H04L 1/1812* (2013.01)

(56) References Cited

U.S. PATENT DOCUMENTS

| | | | |
|---|---|---|---|
| 2018/0167933 A1 | 6/2018 | Yin et al. |
| 2018/0324787 A1 | 11/2018 | Yin et al. |
| 2019/0349942 A1 | 11/2019 | Li et al. |
| 2020/0008227 A1 | 1/2020 | Lee et al. |
| 2020/0037255 A1 | 1/2020 | Liu et al. |
| 2020/0106564 A1 | 4/2020 | Rungta et al. |
| 2020/0145167 A1 | 5/2020 | Jung et al. |
| 2020/0403735 A1 | 12/2020 | Zhao |
| 2021/0266911 A1 | 8/2021 | Zhao |
| 2021/0360614 A1 | 11/2021 | Baldemair et al. |

FOREIGN PATENT DOCUMENTS

| | | |
|---|---|---|
| CN | 109155726 A | 1/2019 |
| CN | 109156028 A | 1/2019 |
| EP | 3471322 A1 | 4/2019 |
| EP | 3796727 A1 | 3/2021 |
| WO | WO-2018/174450 A1 | 9/2018 |
| WO | 2020/069066 A1 | 4/2020 |
| WO | 2020/089875 A1 | 5/2020 |

OTHER PUBLICATIONS

CATT, "Discussion_R1-1812604, Remaining corrections to UCI feedback", 3GPP TSG-RAN WG1 Meeting #95,2018? 11? 3? (Nov. 3, 2018).
International Search Report PCT/ISA/210 for International Application No. PCT/CN2020/071917 Dated Mar. 9, 2020.
Written Opinion of the International Searching Authority PCT/ISA/237 for International Application No. PCT/CN2020/071917 Dated Mar. 9, 2020.
Extended European Search Report dated Mar. 7, 2022 for European Patent Application No. 20756230.7.
Lenovo, Motorola Mobility, "Multiplexing of different UCI types", Agenda Item 7.1.3.2.2, 3GPP TSG RAN WG1 Meeting #92bis, R1-1804212, Apr. 16-20, 2018, Sanya, China.
Non-Final Office Action issued Jan. 21, 2022 in U.S. Appl. No. 17/431,001.
Final Office Action issued May 27, 2022 in U.S. Appl. No. 17/431,001.
Non-Final Office Action issued Nov. 9, 2022 in U.S. Appl. No. 17/431,001.
Final Office Action issued Mar. 1, 2023 in U.S. Appl. No. 17/431,001.
First Office Action issued Feb. 1, 2021 in Chinese Application No. 201910118050.2.
LG Electronics, "Remaining issues on UCI multiplexing," 3GPP TSG RAN WG1 Meeting #92bis, R1-1804556, Sanya, China, Apr. 16, 2018.
Nokia, "On short PUCCH," 3GPP TSG RAN WG1 Meeting #93, R1-1806925, Busan, Korea, May 21, 2018.
Communication pursuant to Article 94(3) issued Apr. 11, 2024 in European Application No. 20 756 230.7.

TRANSMISSION METHOD, TERMINAL AND NETWORK DEVICE

CROSS-REFERENCE TO RELATED APPLICATION

The present application is a continuation application of U.S. patent application Ser. No. 17/431,001 filed on Aug. 13, 2021 which is the U.S. national phase of PCT Application No. PCT/CN2020/071917 filed on Jan. 14, 2020, which claims a priority of the Chinese patent application No. 201910118050.2 filed on Feb. 15, 2019, the entire contents of each of which are incorporated herein by reference in its entirety.

TECHNICAL FIELD

The present disclosure relates to the field of communications technology, in particular to a transmission method, a terminal and a network device.

BACKGROUND

In a 5$^{th}$-Generation New Radio Access Technology (RAT) (5G NR) R16 system, a terminal supports the transmission of various service types, e.g., Ultra Reliably & Low Latency Communication (URLLC) and enhanced Mobile Broadband (eMBB). For the URLLC service, in order to meet a requirement on a low latency, a design scheme where the transmission of a plurality of Physical Uplink Control Channels (PUCCHs) carrying a Hybrid Automatic Repeat reQuest Acknowledgement (HARQ-ACK) is supported in a Time Division Multiplexing (TDM) manner in one slot has been proposed. This scheme is also used to transmit the HARQ-ACK for the URLLC service and the eMBB service through different PUCCHs in a same slot, so as to prevent the transmission of the HARQ-ACKs for different service types in a multiplexed manner.

When the transmission of the plurality of PUCCHs carrying the HARQ-ACK in a TDM manner is supported in one slot, a PUCCH carrying the HARQ-ACK overlaps with a PUCCH carrying other Uplink Control Information (UCI). When it is necessary to determine one PUCCH resource for transmitting the HARQ-ACK and the UCI again, the determined PUCCH resource probably overlaps with another PUCCH carrying the HARQ-ACK in the slot, as shown in FIG. 1, so the two HARQ-ACKs, which should not have overlapped each other, overlap with each other. In this case, there is currently no definite scheme for transmitting a plurality of PUCCHs in a TDM manner in a same slot.

SUMMARY

An object of the present disclosure is to provide a transmission method, a terminal and a network device, so as to transmit a plurality of PUCCHs in a TDM manner in a slot when a PUCCH resource for transmitting the HARQ-ACK and the other UCI in a multiplexed manner overlaps with a PUCCH resource carrying the HARQ-ACK in the slot.

In one aspect, the present disclosure provides in some embodiments a transmission method for a terminal, including: when at least one of at least two PUCCHs carrying an HARQ-ACK in one time unit overlaps with a PUCCH carrying target UCI in the time unit, determining a second PUCCH; and transmitting target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, transmitting the target information in accordance with a predetermined rule. The target information is the HARQ-ACK carried in the at least one PUCCH and the target UCI, or the HARQ-ACK carried in the at least one PUCCH.

In a possible embodiment of the present disclosure, prior to transmitting the target information on the second PUCCH, the transmission method further includes, when the second PUCCH overlaps with the target PUCCH, determining that there is erroneous scheduling.

In a possible embodiment of the present disclosure, the transmitting the target information in accordance with the predetermined rule when the second PUCCH overlapping with the target PUCCH includes: obtaining a third PUCCH by removing symbols in the second PUCCH overlapping with the target PUCCH, or by shifting the second PUCCH forward or backward in a time domain with N symbols; and transmitting the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

In a possible embodiment of the present disclosure, the transmitting the target information in accordance with the predetermined rule when the second PUCCH overlaps with the target PUCCH includes: selecting a PUCCH not overlapping with the target PUCCH as a third PUCCH from a PUCCH resource set determined in accordance with a total quantity of bits of the target UCI and the HARQ-ACK carried in the at least one PUCCH; and transmitting the target information on the third PUCCH.

In a possible embodiment of the present disclosure, the third PUCCH is one of the following: a PUCCH having a minimum or maximum index and not overlapping with the target PUCCH within the PUCCH resource set; or a PUCCH within the PUCCH resource set not overlapping with the target PUCCH and located immediately before or after a PUCCH determined in accordance with a PUCCH resource indication field in Downlink Control Information (DCI) corresponding to the HARQ-ACK within the PUCCH resource set.

In a possible embodiment of the present disclosure, the transmitting the target information in accordance with the predetermined rule when the second PUCCH overlaps with the target PUCCH includes: taking a PUCCH resource in a target PUCCH resource set determined in accordance with a PUCCH resource indication field in DCI corresponding to the HARQ-ACK as a third PUCCH; and transmitting the target information on the third PUCCH. The target PUCCH resource set is a set whose index is greater than or smaller than the PUCCH resource set determined in accordance with the total quantity of bits of the HARQ-ACK on the at least one PUCCH and the target UCI.

In a possible embodiment of the present disclosure, the transmitting the target information in accordance with the predetermined rule when the second PUCCH overlaps with the target PUCCH includes dropping the target UCI, and transmitting the HARQ-ACK on the at least one PUCCH.

In a possible embodiment of the present disclosure, the target UCI is at least one of Channel State information (CSI) and a Scheduling Request (SR).

In a possible embodiment of the present disclosure, the determining the second PUCCH includes: determining one PUCCH resource set in accordance with the total quantity of bits of the HARQ-ACK on the at least one PUCCH and the target UCI, and determining one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determining a PUCCH corresponding to the SR as the second PUCCH; or when the target UCI is CSI and the HARQ-ACK carried in the at least one PUCCH is an HARQ-ACK for a Semi-Persistent Scheduling (SPS) Physical Downlink Shared Channel (PDSCH), determining a PUCCH corresponding to the CSI as the second PUCCH.

In a possible embodiment of the present disclosure, the determining the second PUCCH includes: determining whether the simultaneous transmission of the HARQ-ACK and the target UCI is supported; and in the case that the simultaneous transmission of the HARQ-ACK and the target UCI is supported, determining the second PUCCH.

In another aspect, the present disclosure provides in some embodiments a transmission method for a network device, including: when at least one of at least two PUCCHs carrying an HARQ-ACK in one time unit overlaps with a PUCCH carrying target UCI in the time unit, determining a second PUCCH; and receiving target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, receiving the target information in accordance with a predetermined rule. The target information is the HARQ-ACK carried in the at least one PUCCH and the target UCI, or the HARQ-ACK carried in the at least one PUCCH.

In a possible embodiment of the present disclosure, prior to receiving the target information on the second PUCCH, the transmission method further includes, when the second PUCCH overlaps with the target PUCCH, determining that there is erroneous scheduling.

In a possible embodiment of the present disclosure, the receiving the target information in accordance with the predetermined rule when the second PUCCH overlapping with the target PUCCH includes: obtaining a third PUCCH by removing symbols in the second PUCCH overlapping with the target PUCCH, or by shifting the second PUCCH forward or backward in a time domain with N symbols; and receiving the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

In a possible embodiment of the present disclosure, the receiving the target information in accordance with the predetermined rule when the second PUCCH overlaps with the target PUCCH includes: selecting a PUCCH not overlapping with the target PUCCH as a third PUCCH from a PUCCH resource set determined in accordance with a total quantity of bits of the target UCI and the HARQ-ACK carried in the at least one PUCCH; and receiving the target information on the third PUCCH.

In a possible embodiment of the present disclosure, the third PUCCH is one of the following: a PUCCH having a minimum or maximum index and not overlapping with the target PUCCH within the PUCCH resource set; or a PUCCH within the PUCCH resource set not overlapping with the target PUCCH and located immediately before or after a PUCCH determined in accordance with a PUCCH resource indication field in Downlink Control Information (DCI) corresponding to the HARQ-ACK within the PUCCH resource set.

In a possible embodiment of the present disclosure, the receiving the target information in accordance with the predetermined rule when the second PUCCH overlaps with the target PUCCH includes: taking a PUCCH resource in a target PUCCH resource set determined in accordance with a PUCCH resource indication field in DCI corresponding to the HARQ-ACK as a third PUCCH; and receiving the target information on the third PUCCH. The target PUCCH resource set is a set whose index is greater than or smaller than the PUCCH resource set determined in accordance with the total quantity of bits of the HARQ-ACK on the at least one PUCCH and the target UCI.

In a possible embodiment of the present disclosure, the receiving the target information in accordance with the predetermined rule when the second PUCCH overlaps with the target PUCCH includes dropping the target UCI, and receiving the HARQ-ACK on the at least one PUCCH.

In a possible embodiment of the present disclosure, the target UCI is at least one of CSI and an SR.

In a possible embodiment of the present disclosure, the determining the second PUCCH includes: determining one PUCCH resource set in accordance with the total quantity of bits of the HARQ-ACK on the at least one PUCCH and the target UCI, and determining one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determining a PUCCH corresponding to the SR as the second PUCCH; or when the target UCI is CSI and the HARQ-ACK carried in the at least one PUCCH is an HARQ-ACK for an SPS PDSCH, determining a PUCCH corresponding to the CSI as the second PUCCH.

In a possible embodiment of the present disclosure, the determining the second PUCCH includes: determining whether the simultaneous transmission of the HARQ-ACK and the target UCI is supported; and in the case that the simultaneous transmission of the HARQ-ACK and the target UCI is supported, determining the second PUCCH.

In yet another aspect, the present disclosure provides in some embodiments a terminal, including a transceiver, a memory, a processor, and a program stored in the memory and executed by the processor. The processor is configured to execute the program so as to: when at least one of at least two PUCCHs carrying an HARQ-ACK in one time unit overlaps with a PUCCH carrying target UCI in the time unit, determine a second PUCCH; and transmit target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, transmit the target information in accordance with a predetermined rule. The target information is the HARQ-ACK carried in the at least one PUCCH and the target UCI, or the HARQ-ACK carried in the at least one PUCCH.

In a possible embodiment of the present disclosure, prior to transmitting the target information on the second PUCCH, the processor is further configured to execute the program, so as to, when the second PUCCH overlaps with the target PUCCH, determine that there is erroneous scheduling.

In a possible embodiment of the present disclosure, when transmitting the target information in accordance with the predetermined rule, the processor is further configured to execute the program, so as to: obtain a third PUCCH by removing symbols in the second PUCCH overlapping with the target PUCCH, or by shifting the second PUCCH forward or backward in a time domain with N symbols; and transmit the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

In a possible embodiment of the present disclosure, when transmitting the target information in accordance with the predetermined rule, the processor is further configured to execute the program, so as to: select a PUCCH not overlapping with the target PUCCH as a third PUCCH from a PUCCH resource set determined in accordance with a total quantity of bits of the target UCI and the HARQ-ACK carried in the at least one PUCCH; and transmit the target information on the third PUCCH.

In a possible embodiment of the present disclosure, the third PUCCH is one of the following: a PUCCH having a minimum or maximum index and not overlapping with the target PUCCH within the PUCCH resource set; or a PUCCH within the PUCCH resource set not overlapping with the target PUCCH and located immediately before or after a PUCCH determined in accordance with a PUCCH resource indication field in Downlink Control Information (DCI) corresponding to the HARQ-ACK within the PUCCH resource set.

In a possible embodiment of the present disclosure, when transmitting the target information in accordance with the predetermined rule, the processor is further configured to execute the program, so as to: take a PUCCH resource in a target PUCCH resource set determined in accordance with a PUCCH resource indication field in DCI corresponding to the HARQ-ACK as a third PUCCH; and transmit the target information on the third PUCCH. The target PUCCH resource set is a set whose index is greater than or smaller than the PUCCH resource set determined in accordance with the total quantity of bits of the HARQ-ACK on the at least one PUCCH and the target UCI.

In a possible embodiment of the present disclosure, when transmitting the target information in accordance with the predetermined rule, the processor is further configured to execute the program, so as to drop the target UCI, and transmit the HARQ-ACK on the at least one PUCCH.

In a possible embodiment of the present disclosure, the target UCI is at least one of CSI and an SR.

In a possible embodiment of the present disclosure, when determining the second PUCCH, the processor is further configured to execute the program, so as to: determine one PUCCH resource set in accordance with the total quantity of bits of the HARQ-ACK on the at least one PUCCH and the target UCI, and determine one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determine a PUCCH corresponding to the SR as the second PUCCH; or when the target UCI is CSI and the HARQ-ACK carried in the at least one PUCCH is an HARQ-ACK for an SPS PDSCH, determine a PUCCH corresponding to the CSI as the second PUCCH.

In a possible embodiment of the present disclosure, when determining the second PUCCH, the processor is further configured to execute the program, so as to: determine whether the simultaneous transmission of the HARQ-ACK and the target UCI is supported; and in the case that the simultaneous transmission of the HARQ-ACK and the target UCI is supported, determine the second PUCCH.

In still yet another aspect, the present disclosure provides in some embodiments a computer-readable storage medium storing therein a program. The program is executed by a processor so as to implement the steps of the above-mentioned transmission method for the terminal.

In still yet another aspect, the present disclosure provides in some embodiments a network device, including a transceiver, a memory, a processor, and a program stored in the memory and executed by the processor. The processor is configured to execute the program so as to: when at least one of at least two PUCCHs carrying an HARQ-ACK in one time unit overlaps with a PUCCH carrying target UCI in the time unit, determine a second PUCCH; and receive target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, receive the target information in accordance with a predetermined rule. The target information is the HARQ-ACK carried in the at least one PUCCH and the target UCI, or the HARQ-ACK carried in the at least one PUCCH.

In a possible embodiment of the present disclosure, prior to receiving the target information on the second PUCCH, the processor is further configured to execute the program, so as to, when the second PUCCH overlaps with the target PUCCH, determine that there is erroneous scheduling.

In a possible embodiment of the present disclosure, when receiving the target information in accordance with the predetermined rule, the processor is further configured to execute the program, so as to: obtain a third PUCCH by removing symbols in the second PUCCH overlapping with the target PUCCH, or by shifting the second PUCCH forward or backward in a time domain with N symbols; and receive the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

In a possible embodiment of the present disclosure, when receiving the target information in accordance with the predetermined rule, the processor is further configured to execute the program, so as to: select a PUCCH not overlapping with the target PUCCH as a third PUCCH from a PUCCH resource set determined in accordance with a total quantity of bits of the target UCI and the HARQ-ACK carried in the at least one PUCCH; and receive the target information on the third PUCCH.

In a possible embodiment of the present disclosure, the third PUCCH is one of the following: a PUCCH having a minimum or maximum index and not overlapping with the target PUCCH within the PUCCH resource set; or a PUCCH within the PUCCH resource set not overlapping with the target PUCCH and located immediately before or after a PUCCH determined in accordance with a PUCCH resource indication field in Downlink Control Information (DCI) corresponding to the HARQ-ACK within the PUCCH resource set.

In a possible embodiment of the present disclosure, when receiving the target information in accordance with the predetermined rule, the processor is further configured to execute the program, so as to: take a PUCCH resource in a target PUCCH resource set determined in accordance with a PUCCH resource indication field in DCI corresponding to the HARQ-ACK as a third PUCCH; and receive the target information on the third PUCCH. The target PUCCH resource set is a set whose index is greater than or smaller than the PUCCH resource set determined in accordance with the total quantity of bits of the HARQ-ACK on the at least one PUCCH and the target UCI.

In a possible embodiment of the present disclosure, when receiving the target information in accordance with the predetermined rule, the processor is further configured to execute the program, so as to drop the target UCI, and receive the HARQ-ACK on the at least one PUCCH.

In a possible embodiment of the present disclosure, the target UCI is at least one of CSI and an SR.

In a possible embodiment of the present disclosure, when determining the second PUCCH, the processor is further configured to execute the program, so as to: determine one PUCCH resource set in accordance with the total quantity of bits of the HARQ-ACK on the at least one PUCCH and the target UCI, and determine one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determine a PUCCH corresponding to the SR as the second PUCCH; or when the target UCI is CSI and the HARQ-ACK carried in the at least one PUCCH is an HARQ-ACK for an SPS PDSCH, determine a PUCCH corresponding to the CSI as the second PUCCH.

In a possible embodiment of the present disclosure, when determining the second PUCCH, the processor is further configured to execute the program, so as to: determine whether the simultaneous transmission of the HARQ-ACK and the target UCI is supported; and in the case that the simultaneous transmission of the HARQ-ACK and the target UCI is supported, determine the second PUCCH.

In still yet another aspect, the present disclosure provides in some embodiments a computer-readable storage medium storing therein a program. The program is executed by a processor so as to implement the steps of the above-mentioned transmission method for the network device.

In still yet another aspect, the present disclosure provides in some embodiments a terminal, including: a first determination module configured to, when at least one of at least two PUCCHs carrying an HARQ-ACK in one time unit overlaps with a PUCCH carrying target UCI in the time unit, determine a second PUCCH; and a first transmission module configured to transmit target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, transmit the target information in accordance with a predetermined rule. The target information is the HARQ-ACK carried in the at least one PUCCH and the target UCI, or the HARQ-ACK carried in the at least one PUCCH.

In a possible embodiment of the present disclosure, the terminal further includes a second determination module configured to, before the target information is transmitted by the first transmission module on the second PUCCH, when the second PUCCH overlaps with the target PUCCH, determine that there is erroneous scheduling.

In a possible embodiment of the present disclosure, when the first transmission module is used to transmit the target information in accordance with the target rule, the first transmission module includes: a first processing sub-module configured to obtain a third PUCCH by removing symbols in the second PUCCH overlapping with the target PUCCH, or by shifting the second PUCCH forward or backward in a time domain with N symbols; and a first transmission sub-module configured to transmit the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

In a possible embodiment of the present disclosure, when the first transmission module is used to transmit the target information in accordance with the predetermined rule, the first transmission module includes: a second processing sub-module configured to select a PUCCH not overlapping with the target PUCCH as a third PUCCH from a PUCCH resource set determined in accordance with a total quantity of bits of the target UCI and the HARQ-ACK carried in the at least one PUCCH; and a second transmission sub-module configured to transmit the target information on the third PUCCH.

In a possible embodiment of the present disclosure, the third PUCCH is a PUCCH having a minimum or maximum index and not overlapping with the target PUCCH within the PUCCH resource set; or the third PUCCH is a PUCCH within the PUCCH resource set not overlapping with the target PUCCH and located immediately before or after a PUCCH determined in accordance with a PUCCH resource indication field in DCI corresponding to the HARQ-ACK.

In a possible embodiment of the present disclosure, when the first transmission module is used to transmit the target information in accordance with the predetermined rule, the first transmission module includes: a third processing sub-module configured to take a PUCCH resource in a target PUCCH resource set determined in accordance with a PUCCH resource indication field in DCI corresponding to the HARQ-ACK as a third PUCCH; and a third transmission sub-module configured to transmit the target information on the third PUCCH. The target PUCCH resource set is a set whose index is greater than or smaller than the PUCCH resource set determined in accordance with the total quantity of bits of the HARQ-ACK on the at least one PUCCH and the target UCI.

In a possible embodiment of the present disclosure, when the first transmission module is used to transmit the target information in accordance with the predetermined rule, the first transmission module is configured to drop the target UCI, and transmit the HARQ-ACK on the at least one PUCCH.

In a possible embodiment of the present disclosure, the target UCI is at least one of CSI and an SR.

In a possible embodiment of the present disclosure, the first determination module is further configured to: determine one PUCCH resource set in accordance with the total quantity of bits of the HARQ-ACK on the at least one PUCCH and the target UCI, and determine one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determine a PUCCH corresponding to the SR as the second PUCCH; or when the target UCI is CSI and the HARQ-ACK carried in the at least one PUCCH is an HARQ-ACK for an SPS PDSCH, determine a PUCCH corresponding to the CSI as the second PUCCH.

In a possible embodiment of the present disclosure, the first determination module includes: a first determination sub-module configured to determine whether the simultaneous transmission of the HARQ-ACK and the target UCI is supported; and a second determination sub-module configured to, in the case that the simultaneous transmission of the HARQ-ACK and the target UCI is supported, determine the second PUCCH.

In still yet another aspect, the present disclosure provides in some embodiments a network device, including: a third determination module configured to, when at least one of at least two PUCCHs carrying an HARQ-ACK in one time unit overlaps with a PUCCH carrying target UCI in the time unit, determine a second PUCCH; and a second transmission module configured to, receive target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, receive the target information in accordance with a predetermined rule. The target information is the HARQ-ACK carried in the at least one PUCCH and the target UCI, or the HARQ-ACK carried in the at least one PUCCH.

In a possible embodiment of the present disclosure, the network device further includes a fourth determination module configured to, before the target information is received by the second transmission module on the second PUCCH, when the second PUCCH overlaps with the target PUCCH, determine that there is erroneous scheduling.

In a possible embodiment of the present disclosure, when the second transmission module is used to receive the target information in accordance with the predetermined rule, the second transmission module includes: a fourth processing sub-module configured to obtain a third PUCCH by removing symbols in the second PUCCH overlapping with the target PUCCH, or by shifting the second PUCCH forward or backward in a time domain with N symbols; and a first reception sub-module configured to receive the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

In a possible embodiment of the present disclosure, when the second transmission module is configured to receive the target information in accordance with the predetermined rule, the second transmission module includes: a fifth processing sub-module configured to select a PUCCH not overlapping with the target PUCCH as a third PUCCH from a PUCCH resource set determined in accordance with a total quantity of bits of the target UCI and the HARQ-ACK carried in the at least one PUCCH; and a second reception sub-module configured to receive the target information on the third PUCCH.

In a possible embodiment of the present disclosure, the third PUCCH is a PUCCH having a minimum or maximum index and not overlapping with the target PUCCH within the PUCCH resource set; or the third PUCCH is a PUCCH within the PUCCH resource set not overlapping with the target PUCCH and located immediately before or after a PUCCH determined in accordance with a PUCCH resource indication field in DCI corresponding to the HARQ-ACK.

In a possible embodiment of the present disclosure, when the second transmission module is configured to receive the target information in accordance with the predetermined rule, the second transmission module includes: a sixth processing sub-module configured to take a PUCCH resource in a target PUCCH resource set determined in accordance with a PUCCH resource indication field in DCI corresponding to the HARQ-ACK as a third PUCCH; and receive the target information on the third PUCCH. The target PUCCH resource set is a set whose index is greater than or smaller than the PUCCH resource set determined in accordance with the total quantity of bits of the HARQ-ACK on the at least one PUCCH and the target UCI.

In a possible embodiment of the present disclosure, when the second transmission module is used to receive the target information in accordance with the predetermined rule, the second transmission module is configured to drop the target UCI, and receive the HARQ-ACK on the at least one PUCCH.

In a possible embodiment of the present disclosure, the target UCI is at least one of CSI and an SR.

In a possible embodiment of the present disclosure, the third determination module is further configured to determine one PUCCH resource set in accordance with the total quantity of bits of the HARQ-ACK on the at least one PUCCH and the target UCI, and determine one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determine a PUCCH corresponding to the SR as the second PUCCH; or when the target UCI is CSI and the HARQ-ACK carried in the at least one PUCCH is an HARQ-ACK for an SPS PDSCH, determine a PUCCH corresponding to the CSI as the second PUCCH.

In a possible embodiment of the present disclosure, the third determination module includes: a third determination sub-module configured to determine whether the simultaneous transmission of the HARQ-ACK and the target UCI is supported; and a fourth determination sub-module configured to, in the case that the simultaneous transmission of the HARQ-ACK and the target UCI is supported, determine the second PUCCH.

The present disclosure has the following beneficial effects.

According to the embodiments of the present disclosure, when at least one of the at least two PUCCHs carrying the HARQ-ACK in one time unit overlaps with the PUCCH carrying the target UCI in the time unit, the second PUCCH is determined, and then the target information is transmitted on the second PUCCH. The second PUCCH does not overlap with the target PUCCH, the target PUCCH is a PUCCH carrying the HARQ-ACK other than the at least one PUCCH in the time unit. Alternatively, when the second PUCCH overlapping with the target PUCCH, the target information is transmitted in accordance with the predetermined rule. As a result, it is able to prevent a plurality of HARQ-ACKs, which should not have overlapped each other, from overlapping with each other, thereby to transmit the plurality of HARQ-ACKs in a TDM manner.

DETAILED DESCRIPTION

Figure 1:
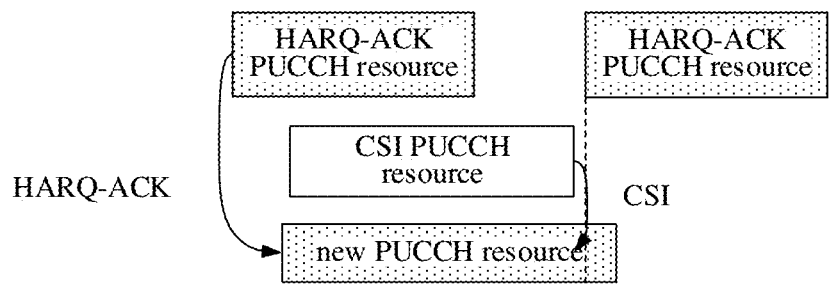
FIG. 1 is a schematic view showing positions of a re-determined PUCCH resource and an HARQ-ACK PUCCH resource.

In order to make the objects, the technical solutions and the advantages of the present disclosure more apparent, the present disclosure will be described hereinafter in a clear and complete manner in conjunction with the drawings and embodiments.

In order to enable a person skilled in the art to understand the technical schemes in the embodiments of the present disclosure in a better manner, the following description will be given at first.

In an NR system, five NR PUCCH formats, i.e., formats 0, 1, 2, 3 and 4, have been defined. The PUCCH formats 0 and 1 are used for the transmission of UCI having one or two bits, and the PUCCH formats 2, 3 and 4 are used for the transmission of UCI having more than two bits. The PUCCH formats 0 and 2 belong to short PUCCHs, and they each occupy one or two symbols for the transmission. The PUCCH formats 1, 3 and 4 belong to long PUCCHs, and they each occupy four to fourteen symbols for the transmission.

An SR is transmitted using the PUCCH format 0 or 1. A transmission periodicity and an offset for the SR are pre-configured through high-layer signaling, and a transmission opportunity for the SR is determined in accordance with the transmission periodicity and the offset. In the SR transmission opportunity, when there is the SR (i.e., a positive SR), the SR is transmitted using a PUCCH format preconfigured for the SR through the high-layer signaling. When there is a negative SR, the SR is not transmitted.

The HARQ-ACK is transmitted using any of the five formats. When the HARQ-ACK has one or two bits, it is configured to be transmitted using the PUCCH format 0 or 1. When the HARQ-ACK has more than two bits, one PUCCH resource set is selected from a plurality of PUCCH resource sets preconfigured for a terminal in accordance with the quantity of bits, and each PUCCH resource set corresponds to one range of the quantity of bits. In the selected PUCCH resource set, one PUCCH resource is selected in accordance with a PUCCH resource indication field in a DCI format used by a PDCCH corresponding to the HARQ-ACK, and the HARQ-ACK is transmitted on the selected PUCCH resource.

Periodic CSI is configured to be transmitted using the PUCCH format 2, 3 or 4. After channel encoding and rate matching, the to-be-transmitted periodic CSI is mapped to a PUCCH resource other than a pilot for transmission.

Figure 2:
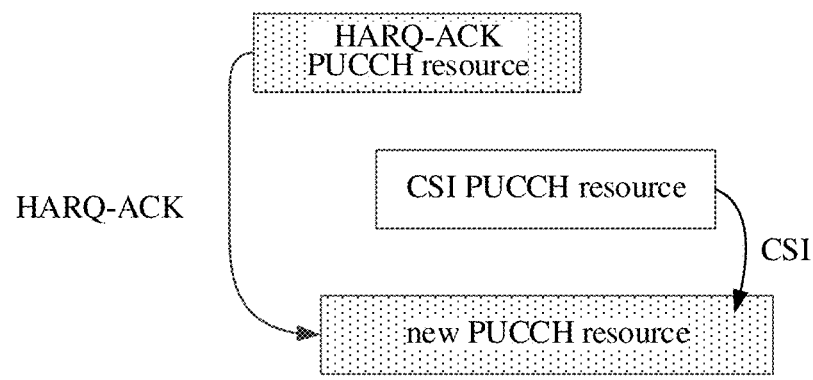
FIG. 2 is a schematic view showing the transmission of an HARQ-ACK and CSI in a multiplexed manner.

In one slot, there probably exist a plurality of PUCCHs carrying different pieces of UCI concurrently, and these PUCCHs probably overlap with each other. When the PUCCHs overlap with each other, the pieces of UCI overlapping with each other is transmitted on a PUCCH in a multiplexed manner in accordance with a specific UCI multiplexing rule, so as to prevent the simultaneous transmission of a plurality of PUCCHs. For example, as shown in FIG. 2, when the HARQ-ACK overlaps with the CSI, PUCCH resource reselection is performed in accordance with the total quantity of bits of the HARQ-ACK and the CSI, i.e., a resource capable of carrying the HARQ-ACK and the CSI simultaneously is selected for the transmission. To be specific, one PUCCH resource set is selected from a plurality of configured PUCCH resource sets in accordance with the total quantity of bits of the HARQ-ACK and the CSI, and then one PUCCH resource is determined in the reselected PUCCH resource set in accordance with a PUCCH resource indication field in a last piece of DCI corresponding to the HARQ-ACK, so as to transmit the HARQ-ACK and the CSI simultaneously. A specific resource position of the PUCCH resource determined in accordance with the total quantity of bits of the HARQ-ACK and the CSI is probably different from an original resource position for transmitting the HARQ-ACK and the CSI.

Figure 3:
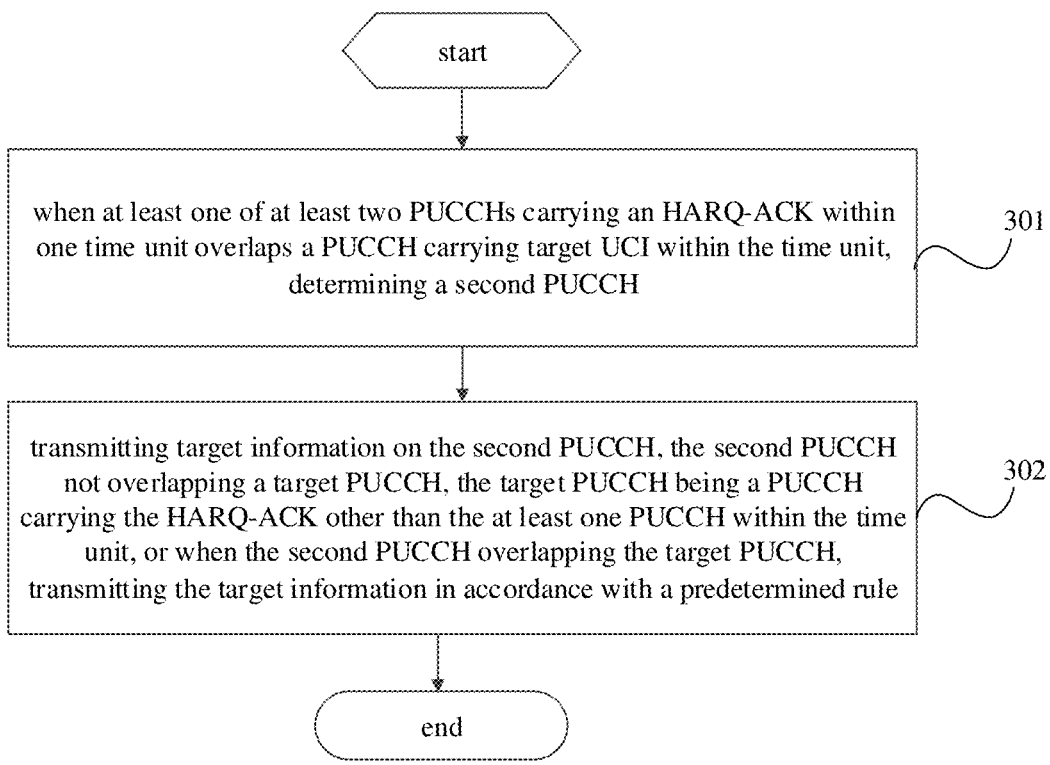
FIG. 3 is a flow chart of a transmission method according to one embodiment of the present disclosure.

As shown in FIG. 3, the present disclosure provides in some embodiments a transmission method for a terminal, which includes the following steps.

Step 301: when at least one of at least two PUCCHs carrying an HARQ-ACK in one time unit overlaps with a PUCCH carrying target UCI in the time unit, determining a second PUCCH.

In the embodiments of the present disclosure, the time unit is specifically a slot, a subframe or a mini-slot. The target UCI is specifically at least one of CSI and an SR. The second PUCCH is a PUCCH determined in accordance with a UCI multiplexing transmission rule and configured to carry the HARQ-ACK on the at least one PUCCH and the PUCCH of the target UCI.

Step 302: transmitting target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, transmitting the target information in accordance with a predetermined rule.

The target information is the HARQ-ACK carried in the at least one PUCCH and the target UCI, or the HARQ-ACK carried in the at least one PUCCH.

During the implementation, subsequent to determining the second PUCCH, in a possible embodiment of the present disclosure, the terminal always assumes that the second PUCCH determined in Step 301 does not overlap with the target PUCCH, so the terminal directly transmits the HARQ-ACK on the at least one PUCCH and the target UCI on the second PUCCH, or directly transmits the HARQ-ACK on the at least one PUCCH on the second PUCCH in accordance with the UCI multiplexing transmission rule.

Subsequent to determining the second PUCCH, in another possible embodiment of the present disclosure, the terminal determines whether the second PUCCH overlaps with the target PUCCH, and when the second PUCCH overlaps with the target PUCCH, the terminal transmits the target information in accordance with the predetermined rule.

The transmitting the target information in accordance with the predetermined rule specifically includes determining a third PUCCH not overlapping with the target PUCCH and transmitting the target information on the third PUCCH, or dropping the target UCI and transmitting the HARQ-ACK on the at least one PUCCH.

Here, through transmitting the target information in accordance with the predetermined rule, it is able to ensure that the PUCCH resource for transmitting the pieces of UCI overlapping with each other in a multiplexed manner does not overlap with the PUCCH resource carrying the HARQ-ACK in the time unit. Alternatively, when it is impossible to ensure that the PUCCH resource for transmitting the pieces of UCI overlapping with each other in a multiplexed manner does not overlap with the PUCCH resource carrying the HARQ-ACK, the target UCI is dropped, so as to prevent a plurality of HARQ-ACKs, which should not have overlapped each other, from overlapping with each other when the at least one PUCCH in the plurality of PUCCHs carrying the HARQ-ACK overlaps with the PUCCH carrying the other UCI.

According to the transmission method in the embodiments of the present disclosure, when at least one PUCCH in the plurality of PUCCHs carrying the HARQ-ACK in one time unit overlaps with the PUCCH carrying the other UCI, it is able to ensure that the determined PUCCH resource for transmitting the pieces of UCI overlapping with each other in a multiplexed manner does not overlap with the PUCCH resource carrying the HARQ-ACK. Alternatively, when it is impossible to ensure that the determined PUCCH resource for transmitting the pieces of UCI overlapping with each other in a multiplexed manner does not overlap with the PUCCH resource carrying the HARQ-ACK, the other UCI is dropped. As a result, it is able to prevent the plurality of HARQ-ACKs, which should not have overlapped each other, from overlapping with each other when the at least one PUCCH in the plurality of PUCCHs carrying the HARQ-ACK overlaps with the PUCCH carrying the other UCI, thereby to support the transmission of the plurality of HARQ-ACKs in a TDM manner.

In a possible embodiment of the present disclosure, prior to transmitting the target information on the second PUCCH, the transmission method further includes, when the second PUCCH overlaps with the target PUCCH, determining that there is erroneous scheduling.

Here, the terminal always assumes that the second PUCCH determined in Step 301 does not overlaps with the target PUCCH. Hence, when it is determined that the second PUCCH overlaps with the target PUCCH, the terminal determines that there is the erroneous scheduling. In other words, the terminal does not expect that the second PUCCH overlaps with the target PUCCH.

In a possible embodiment of the present disclosure, the transmitting the target information in accordance with the predetermined rule when the second PUCCH overlapping with the target PUCCH includes: obtaining the third PUCCH by removing symbols in the second PUCCH overlapping with the target PUCCH, or by shifting the second PUCCH forward or backward in a time domain with N symbols; and transmitting the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

For example, when last three symbols in the second PUCCH overlap with the target PUCCH, the last three symbols in the second PUCCH are removed, or the second PUCCH is translated forward in the time domain by three symbols, so as to obtain the third PUCCH not overlapping with the target PUCCH and transmit the target information on the third PUCCH. In this way, it is able to prevent the HARQ-ACKs, which should not have overlapped each other, from overlapping with each other, thereby to transmit the HARQ-ACKs in a TDM manner.

For another example, when the second PUCCH occupy eighth to fourteenth symbols in one slot for transmission and the target PUCCH occupies a thirteenth symbol for transmission, the thirteenth symbol is removed, so as to obtain a third PUCCH occupying five inconsecutive symbols, i.e., eighth to twelfth and fourteenth symbols, in one slot for transmission. Alternatively, the second PUCCH is translated forward by two symbols (i.e., the quantity of symbols between the last symbol of the second PUCCH and the first symbol of the target PUCCH), or translated backward by six symbols (i.e., the quantity of symbols between the first symbol in the second PUCCH and the last symbol in the target PUCCH). In this way, it is able to prevent the HARQ-ACKs, which should not have overlapped each other, from overlapping with each other, thereby to transmit the HARQ-ACKs in a TDM manner.

For yet another example, when the target PUCCH occupies eleventh to fourteenth symbols in one slot and the second PUCCH occupies twelfth and thirteenth symbols, the second PUCCH is translated forward by three symbols (i.e., the quantity of symbols between the first symbol in the target PUCCH and the last symbol in the target PUCCH overlapping with the second PUCCH), or translated backward by three symbols (i.e., the quantity of symbols between the last symbol in the target PUCCH and the first symbol in the target PUCCH overlapping with the second PUCCH). In this way, it is able to prevent the HARQ-ACKs, which should not have overlapped each other, from overlapping with each other, thereby to transmit the HARQ-ACKs in a TDM manner.

For still yet another example, when the target PUCCH occupies thirteenth and fourteenth symbols and the second PUCCH occupies twelfth and thirteenth symbols in one slot, a second symbol in the second PUCCH is removed, so as to obtain the third PUCCH transmitted merely on the twelfth symbol. Alternatively, the second PUCCH is translated forward by one symbol (i.e., the quantity of symbols between the last symbol in the second PUCCH and the first symbol in the target PUCCH), or translated backward by three symbols (i.e., the quantity of symbols between the first symbol in the second PUCCH and the last symbol in the target PUCCH). In this way, it is able to prevent the HARQ-ACKs, which should not have overlapped each other, from overlapping with each other, thereby to transmit the HARQ-ACKs in a TDM manner.

In a possible embodiment of the present disclosure, the transmitting the target information in accordance with the predetermined rule when the second PUCCH overlaps with the target PUCCH includes: selecting a PUCCH not overlapping with the target PUCCH as the third PUCCH from a PUCCH resource set determined in accordance with a total quantity of bits of the target UCI and the HARQ-ACK carried in the at least one PUCCH; and transmitting the target information on the third PUCCH.

The third PUCCH is a PUCCH having a minimum or maximum index and not overlapping with the target PUCCH within the PUCCH resource set; or the third PUCCH is a PUCCH within the PUCCH resource set not overlapping with the target PUCCH and located immediately before or after a PUCCH determined in accordance with a PUCCH resource indication field in DCI corresponding to the HARQ-ACK.

Here, when the second PUCCH overlaps with the target PUCCH, a PUCCH not overlapping with the target PUCCH is reselected as the third PUCCH from the PUCCH resource set determined in accordance with the total quantity of bits of the HARQ-ACK on the at least one PUCCH and the target UCI, and then the target information is transmitted on the third PUCCH. In this way, it is able to prevent the HARQ-ACKs, which should not have overlapped each other, from overlapping with each other, thereby to transmit the HARQ-ACKs in a TDM manner.

In a possible embodiment of the present disclosure, the transmitting the target information in accordance with the predetermined rule when the second PUCCH overlaps with the target PUCCH includes: taking a PUCCH resource in a target PUCCH resource set determined in accordance with a PUCCH resource indication field in DCI corresponding to the HARQ-ACK as a third PUCCH; and transmitting the target information on the third PUCCH. The target PUCCH resource set is a set whose index is greater than or smaller than the PUCCH resource set determined in accordance with the total quantity of bits of the HARQ-ACK on the at least one PUCCH and the target UCI.

Here, when the second PUCCH overlaps with the target PUCCH, one PUCCH resource set is reselected, and a PUCCH resource is determined in the reselected PUCCH resource set in accordance with the PUCCH resource indication field in the DCI corresponding to the HARQ-ACK, so as to obtain the third PUCCH not overlapping with the target PUCCH, and then the target information is transmitted on the third PUCCH. In this way, it is able to prevent the HARQ-ACKs, which should not have overlapped each other, from overlapping with each other, thereby to transmit the HARQ-ACKs in a TDM manner.

In a possible embodiment of the present disclosure, the transmitting the target information in accordance with the predetermined rule when the second PUCCH overlaps with the target PUCCH includes dropping the target UCI, and transmitting the HARQ-ACK on the at least one PUCCH.

Here, through dropping the target UCI and transmitting the HARQ-ACK on the at least one PUCCH, it is able to prevent the HARQ-ACKs, which should not have overlapped each other, from overlapping with each other, thereby to transmit the HARQ-ACKs in a TDM manner.

In the embodiments of the present disclosure, the target UCI is at least one of CSI and an SR.

In a possible embodiment of the present disclosure, the determining the second PUCCH includes: determining one PUCCH resource set in accordance with the total quantity of bits of the HARQ-ACK on the at least one PUCCH and the target UCI, and determining one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determining a PUCCH corresponding to the SR as the second PUCCH; or when the target UCI is CSI and the HARQ-ACK carried in the at least one PUCCH is an HARQ-ACK for an SPS PDSCH, determining a PUCCH corresponding to the CSI as the second PUCCH.

In a possible embodiment of the present disclosure, the determining the second PUCCH includes: determining whether the simultaneous transmission of the HARQ-ACK and the target UCI is supported; and in the case that the simultaneous transmission of the HARQ-ACK and the target UCI is supported, determining the second PUCCH.

According to the transmission method in the embodiments of the present disclosure, when at least one of the plurality of PUCCHs carrying the HARQ-ACK in one slot overlaps with the PUCCH carrying the other UCI in the slot, it is able to ensure that the determined PUCCH resource for transmitting the UCI overlapping with each other in a multiplexed manner does not overlap with the PUCCH resource carrying the HARQ-ACK. Alternatively, when at least one of the plurality of PUCCHs carrying the HARQ-ACK overlaps with the PUCCH carrying the other UCI, the other UCI is dropped. As a result, it is able to prevent the HARQ-ACKs, which should not have overlapped each other, from overlapping with each other, thereby to transmit the HARQ-ACKs in a TDM manner.

Figure 4:
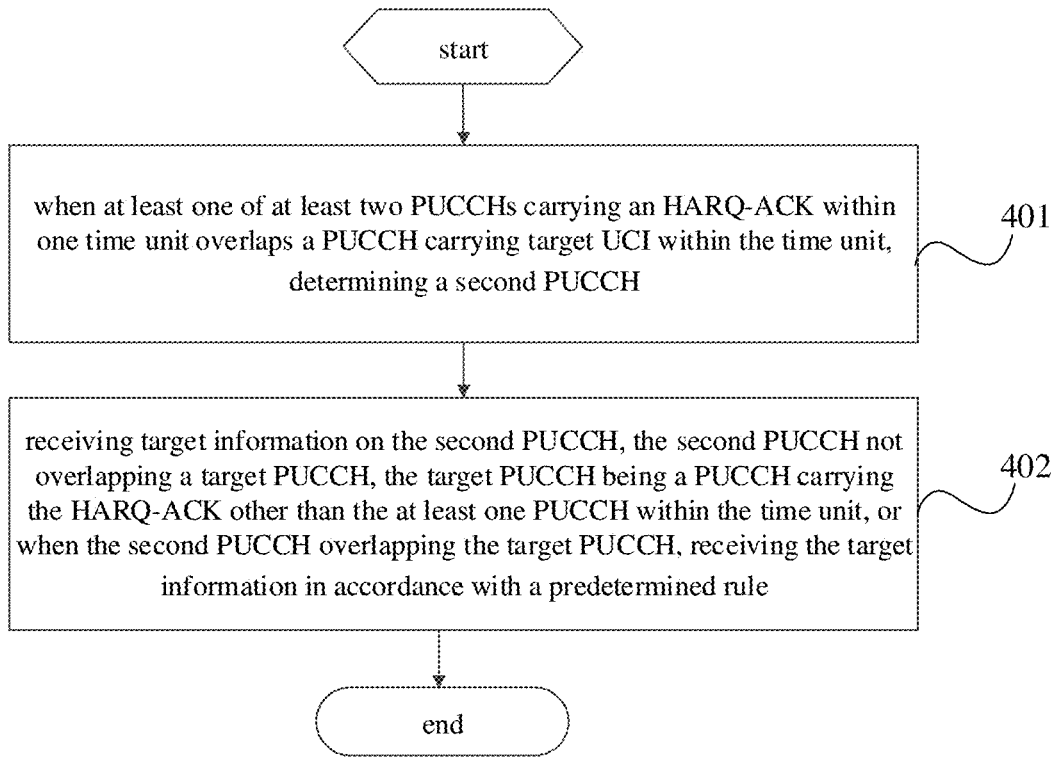
FIG. 4 is another flow chart of the transmission method according to one embodiment of the present disclosure.

As shown in FIG. 4, the present disclosure further provides in some embodiments a transmission method applied for a network device, which includes the following steps.

Step 401: when at least one of at least two PUCCHs carrying an HARQ-ACK in one time unit overlaps with a PUCCH carrying target UCI in the time unit, determining a second PUCCH.

In the embodiments of the present disclosure, the time unit is specifically a slot. The target UCI is specifically at least one of CSI and an SR. The second PUCCH is a PUCCH determined in accordance with a UCI multiplexing transmission rule and configured to carry the HARQ-ACK on the at least one PUCCH and the target UCI.

Step 402: receiving target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, receiving the target information in accordance with a predetermined rule.

The target information is the HARQ-ACK carried in the at least one PUCCH and the target UCI, or the HARQ-ACK carried in the at least one PUCCH.

During the implementation, subsequent to determining the second PUCCH, in a possible embodiment of the present disclosure, the network device always assumes that the second PUCCH determined in Step 401 does not overlap with the target PUCCH, so the network device directly receives the HARQ-ACK on the at least one PUCCH and the target UCI on the second PUCCH, or directly receives the HARQ-ACK on the at least one PUCCH on the second PUCCH.

Subsequent to determining the second PUCCH, in another possible embodiment of the present disclosure, the network device determines whether the second PUCCH overlaps with the target PUCCH, and when the second PUCCH overlaps with the target PUCCH, the network device receives the target information in accordance with the predetermined rule.

The receiving the target information in accordance with the predetermined rule specifically includes determining a third PUCCH not overlapping with the target PUCCH and receiving the target information on the third PUCCH, or dropping the target UCI and receiving the HARQ-ACK on the at least one PUCCH.

Here, through receiving the target information in accordance with the predetermined rule, it is able to ensure that the PUCCH resource for transmitting the pieces of UCI overlapping with each other in a multiplexed manner does not overlap with the PUCCH resource carrying the HARQ-ACK in the time unit. Alternatively, when it is impossible to ensure that the PUCCH resource for transmitting the pieces of UCI overlapping with each other in a multiplexed manner does not overlap with the PUCCH resource carrying the HARQ-ACK, the target UCI is dropped, so as to prevent a plurality of HARQ-ACKs, which should not have overlapped each other, from overlapping with each other when the at least one PUCCH in the plurality of PUCCHs carrying the HARQ-ACK overlaps with the PUCCH carrying the other UCI.

According to the transmission method in the embodiments of the present disclosure, when at least one PUCCH in the plurality of PUCCHs carrying the HARQ-ACK in one time unit overlaps with the PUCCH carrying the other UCI, it is able to ensure that the determined PUCCH resource for transmitting the pieces of UCI overlapping with each other in a multiplexed manner does not overlap with the PUCCH resource carrying the HARQ-ACK. Alternatively, when it is impossible to ensure that the determined PUCCH resource for transmitting the pieces of UCI overlapping with each other in a multiplexed manner does not overlap with the PUCCH resource carrying the HARQ-ACK, the other UCI is dropped. As a result, it is able to prevent the plurality of HARQ-ACKs, which should not have overlapped each other, from overlapping with each other when the at least one PUCCH in the plurality of PUCCHs carrying the HARQ-ACK overlaps with the PUCCH carrying the other UCI, thereby to support the transmission of the plurality of HARQ-ACKs in a TDM manner.

In a possible embodiment of the present disclosure, prior to receiving the target information on the second PUCCH, the transmission method further includes, when the second PUCCH overlaps with the target PUCCH, determining that there is erroneous scheduling.

Here, the network device always assumes that the second PUCCH determined in Step 401 does not overlaps with the target PUCCH. Hence, when it is determined that the second PUCCH overlaps with the target PUCCH, the network device determines that there is the erroneous scheduling.

In a possible embodiment of the present disclosure, the receiving the target information in accordance with the predetermined rule when the second PUCCH overlapping with the target PUCCH includes: obtaining a third PUCCH by removing symbols in the second PUCCH overlapping with the target PUCCH, or by shifting the second PUCCH forward or backward in a time domain with N symbols; and receiving the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

For example, when last three symbols in the second PUCCH overlap with the target PUCCH, the last three symbols in the second PUCCH are removed, or the second PUCCH is translated forward in the time domain by three symbols, so as to obtain the third PUCCH not overlapping with the target PUCCH and transmit the target information on the third PUCCH. In this way, it is able to prevent the HARQ-ACKs, which should not have overlapped each other, from overlapping with each other, thereby to transmit the HARQ-ACKs in a TDM manner.

For another example, when the second PUCCH occupy eighth to fourteenth symbols in one slot for transmission and the target PUCCH occupies a thirteenth symbol for transmission, the thirteenth symbol is removed, so as to obtain a third PUCCH occupying five inconsecutive symbols, i.e., eighth to twelfth and fourteenth symbols, in one slot for transmission. Alternatively, the second PUCCH is translated forward by two symbols (i.e., the quantity of symbols between the last symbol of the second PUCCH and the first symbol of the target PUCCH), or translated backward by six symbols (i.e., the quantity of symbols between the first symbol in the second PUCCH and the last symbol in the target PUCCH). In this way, it is able to prevent the HARQ-ACKs, which should not have overlapped each other, from overlapping with each other, thereby to transmit the HARQ-ACKs in a TDM manner.

For yet another example, when the target PUCCH occupies eleventh to fourteenth symbols in one slot and the second PUCCH occupies twelfth and thirteenth symbols, the second PUCCH is translated forward by three symbols (i.e., the quantity of symbols between the first symbol in the target PUCCH and the last symbol in the target PUCCH overlapping with the second PUCCH), or translated backward by three symbols (i.e., the quantity of symbols between the last symbol in the target PUCCH and the first symbol in the target PUCCH overlapping with the second PUCCH). In this way, it is able to prevent the HARQ-ACKs, which should not have overlapped each other, from overlapping with each other, thereby to transmit the HARQ-ACKs in a TDM manner.

For still yet another example, when the target PUCCH occupies thirteenth and fourteenth symbols and the second PUCCH occupies twelfth and thirteenth symbols in one slot, a second symbol in the second PUCCH is removed, so as to obtain the third PUCCH transmitted merely on the twelfth symbol. Alternatively, the second PUCCH is translated forward by one symbol (i.e., the quantity of symbols between the last symbol in the second PUCCH and the first symbol in the target PUCCH), or translated backward by three symbols (i.e., the quantity of symbols between the first symbol in the second PUCCH and the last symbol in the target PUCCH). In this way, it is able to prevent the HARQ-ACKs, which should not have overlapped each other, from overlapping with each other, thereby to transmit the HARQ-ACKs in a TDM manner.

In a possible embodiment of the present disclosure, the receiving the target information in accordance with the predetermined rule when the second PUCCH overlaps with the target PUCCH includes: selecting a PUCCH not overlapping with the target PUCCH as a third PUCCH from a PUCCH resource set determined in accordance with a total quantity of bits of the target UCI and the HARQ-ACK carried in the at least one PUCCH; and receiving the target information on the third PUCCH.

The third PUCCH is a PUCCH having a minimum or maximum index and not overlapping with the target PUCCH within the PUCCH resource set; or the third PUCCH is a PUCCH within the PUCCH resource set not overlapping with the target PUCCH and located immediately before or after a PUCCH determined in accordance with a PUCCH resource indication field in DCI corresponding to the HARQ-ACK.

Here, when the second PUCCH overlaps with the target PUCCH, a PUCCH not overlapping with the target PUCCH is reselected as the third PUCCH from the PUCCH resource set determined in accordance with the total quantity of bits of the HARQ-ACK on the at least one PUCCH and the target UCI, and then the target information is received on the third PUCCH. In this way, it is able to prevent the HARQ-ACKs, which should not have overlapped each other, from overlapping with each other, thereby to transmit the HARQ-ACKs in a TDM manner.

In a possible embodiment of the present disclosure, the receiving the target information in accordance with the predetermined rule when the second PUCCH overlaps with the target PUCCH includes: taking a PUCCH resource in a target PUCCH resource set determined in accordance with a PUCCH resource indication field in DCI corresponding to the HARQ-ACK as a third PUCCH; and receiving the target information on the third PUCCH. The target PUCCH resource set is a set whose index is greater than or smaller than the PUCCH resource set determined in accordance with the total quantity of bits of the HARQ-ACK on the at least one PUCCH and the target UCI.

Here, when the second PUCCH overlaps with the target PUCCH, one PUCCH resource set is reselected, and a PUCCH resource is determined in the reselected PUCCH resource set in accordance with the PUCCH resource indication field in the DCI corresponding to the HARQ-ACK, so as to obtain the third PUCCH not overlapping with the target PUCCH, and then the target information is transmitted on the third PUCCH. In this way, it is able to prevent the HARQ-ACKs, which should not have overlapped each other, from overlapping with each other, thereby to transmit the HARQ-ACKs in a TDM manner.

In a possible embodiment of the present disclosure, the receiving the target information in accordance with the predetermined rule when the second PUCCH overlaps with the target PUCCH includes dropping the target UCI, and receiving the HARQ-ACK on the at least one PUCCH.

Here, through dropping the target UCI and receiving the HARQ-ACK on the at least one PUCCH, it is able to prevent the HARQ-ACKs, which should not have overlapped each other, from overlapping with each other, thereby to transmit the HARQ-ACKs in a TDM manner.

In the embodiments of the present disclosure, the target UCI is at least one of CSI and an SR.

In a possible embodiment of the present disclosure, the determining the second PUCCH includes: determining one PUCCH resource set in accordance with the total quantity of bits of the HARQ-ACK on the at least one PUCCH and the target UCI, and determining one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determining a PUCCH corresponding to the SR as the second PUCCH; or when the target UCI is CSI and the HARQ-ACK carried in the at least one PUCCH is an HARQ-ACK for an SPS PDSCH, determining a PUCCH corresponding to the CSI as the second PUCCH.

In a possible embodiment of the present disclosure, the determining the second PUCCH includes: determining whether the simultaneous transmission of the HARQ-ACK and the target UCI is supported; and in the case that the simultaneous transmission of the HARQ-ACK and the target UCI is supported, determining the second PUCCH.

According to the transmission method in the embodiments of the present disclosure, when at least one of the plurality of PUCCHs carrying the HARQ-ACK in one slot overlaps with the PUCCH carrying the other UCI in the slot, it is able to ensure that the determined PUCCH resource for transmitting the UCI overlapping with each other in a multiplexed manner does not overlap with the PUCCH resource carrying the HARQ-ACK. Alternatively, when at least one of the plurality of PUCCHs carrying the HARQ-ACK overlaps with the PUCCH carrying the other UCI, the other UCI is dropped. As a result, it is able to prevent the HARQ-ACKs, which should not have overlapped each other, from overlapping with each other, thereby to transmit the HARQ-ACKs in a TDM manner.

The transmission method will be described hereinafter in conjunction with the embodiments.

Figure 5:
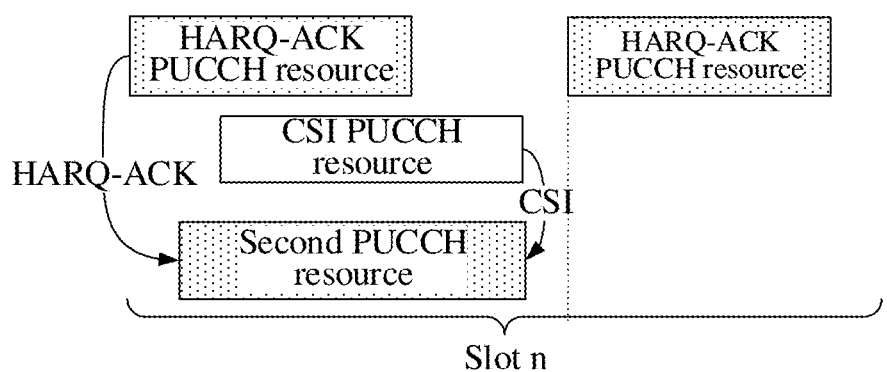
FIG. 5 is a schematic view showing the transmission of an HARQ-ACK and CSI in a slot n according to one embodiment of the present disclosure.

As shown in FIG. 5, the target UCI is CSI, there are two PUCCHs carrying the HARQ-ACK and transmitted in a TDM manner in a slot n, and a PUCCH carrying the CSI overlaps with a first PUCCH carrying the HARQ-ACK. On the basis of the UCI multiplexing transmission rule, when the PUCCH carrying the CSI and the first PUCCH carrying the HARQ-ACK have met a predetermined time condition (which is used to determine whether UCI is transmitted in a processing delay in a multiplexed manner), e.g., when an interval between a first symbol in an earlier channel of two channels and a PDSCH corresponding to the HARQ-ACK is not smaller than a predetermined value 1 and an interval between the first symbol in the earlier channel and the DCI corresponding to the HARQ-ACK is not smaller than a predetermined value 2, one PUCCH resource is determined again to carry the CSI and a first HARQ-ACK. On the basis of an existing PUCCH resource allocation rule, presumed that four PUCCH resource sets have been configured for the UE and each PUCCH resource set includes eight PUCCH resources, a second PUCCH resource set is determined in accordance with a total quantity of bits of the CSI and the first HARQ-ACK. In a possible embodiment of the present disclosure, a fourth PUCCH resources in the second PUCCH resource set is determined as the second PUCCH resource in accordance with a PUCCH resource indication field in a last piece of DCI corresponding to the HARQ-ACK. At this time, there are the following circumstances.

In one circumstance, the terminal always assumes that the second PUCCH resource determined as mentioned hereinabove does not overlap with the second PUCCH carrying the HARQ-ACK in the slot, so the terminal directly transmits the CSI and the first HARQ-ACK simultaneously on the determined second PUCCH resource, and the normal transmission of a second HARQ-ACK is not adversely affected, as shown in FIG. 5.

Figure 6:
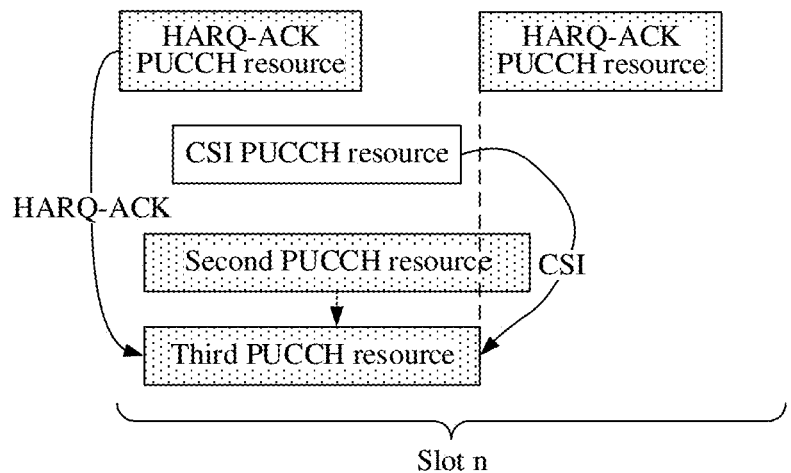
FIG. 6 is another schematic view showing the transmission of the HARQ-ACK and the CSI in the slot n according to one embodiment of the present disclosure.
Figure 7:
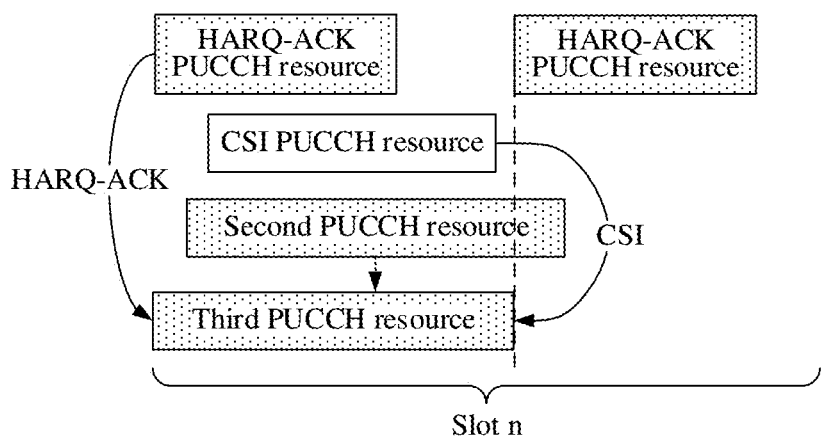
FIG. 7 is yet another schematic view showing the transmission of the HARQ-ACK and the CSI in the slot n according to one embodiment of the present disclosure.

In another circumstance, presumed that the determined second PUCCH resource overlaps with the second HARQ-ACK in the slot, the terminal removes a part of the second PUCCH resource overlapping with the second HARQ-ACK, so as to obtain a new PUCCH resource, i.e., the third PUCCH resource. The CSI and the first HARQ-ACK are transmitted simultaneously on the third PUCCH resource, and the normal transmission of the second HARQ-ACK is not adversely affected, as shown in FIG. 6. Alternatively, the second PUCCH resource is translated forward by several symbols, so as to prevent the first HARQ-ACK from overlapping with the second HARQ-ACK. At this time, of course, scheduling performed by a base station needs to ensure that there is no conflict between the determined PUCCH resource and a PUCCH resource for the other terminal, as shown in FIG. 7.

Figure 8:
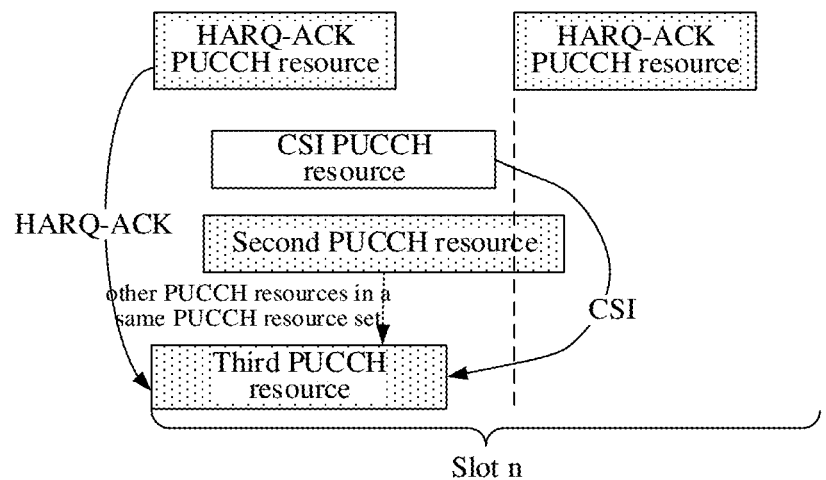
FIG. 8 is still yet another schematic view showing the transmission of the HARQ-ACK and the CSI in the slot n according to one embodiment of the present disclosure.

In yet another circumstance, a PUCCH resource not overlapping with the second HARQ-ACK is selected from the second PUCCH resource set as the third PUCCH resource. The CSI and the first HARQ-ACK are transmitted simultaneously on the third PUCCH resource, and the normal transmission of the second HARQ-ACK is not adversely affected, as shown in FIG. 8. The resource is a resource in the set having a minimum or maximum index and satisfying a condition, or a resource located immediately before or after a resource determined in accordance with an original PUCCH resource indication field and satisfying the condition. Here, the condition refers to that the selected PUCCH does not overlap with the target PUCCH. Of course, the base station needs to perform the scheduling, so as to ensure that the third PUCCH resource determined in accordance with the predetermined rule is not occupied by the other terminal, so as to prevent the interference between the terminals.

Figure 9:
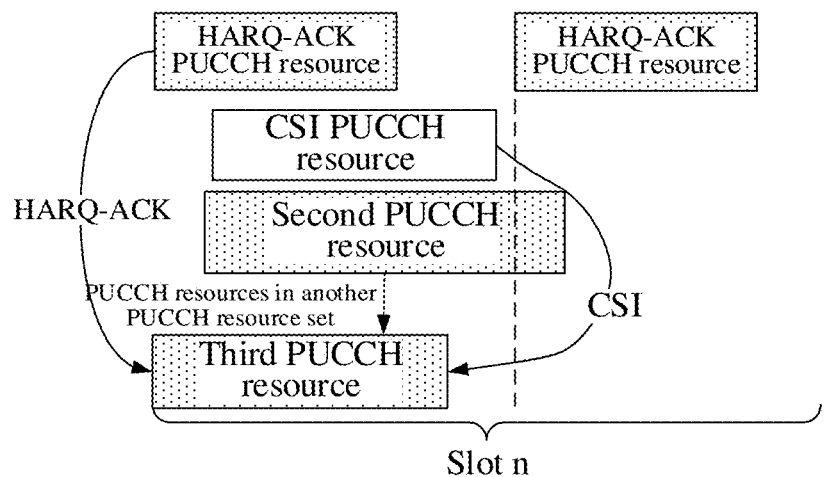
FIG. 9 is still yet another schematic view showing the transmission of the HARQ-ACK and the CSI in the slot n according to one embodiment of the present disclosure.

In still yet another circumstance, another PUCCH resource set, e.g., a third PUCCH resource set, is selected, and one PUCCH resource is determined in the third PUCCH resource set in accordance with a PUCCH resource indication field in a last piece of DCI corresponding to the HARQ-ACK. This resource does not overlap with the PUCCH resource carrying the second HARQ-ACK, so it is taken as the third PUCCH resource. The CSI and the first HARQ-ACK are transmitted simultaneously on the third PUCCH resource, and the normal transmission of the second HARQ-ACK is not adversely affected, as shown in FIG. 9. Of course, the base station needs to perform the scheduling, so as to ensure that the third PUCCH resource determined in accordance with the predetermined rule is not occupied by the other terminal, so as to prevent the interference between the terminals.

Figure 10:
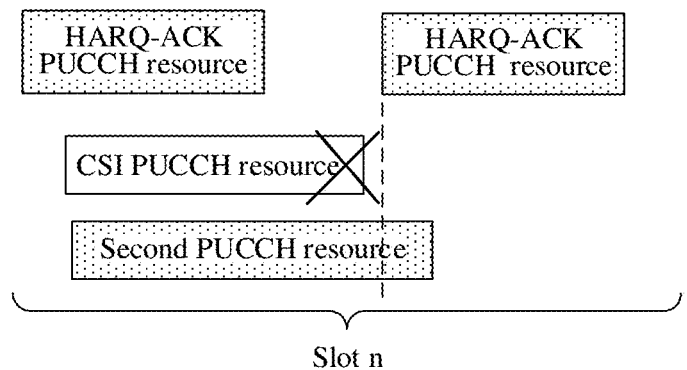
FIG. 10 is still yet another schematic view showing the transmission of the HARQ-ACK and the CSI in the slot n according to one embodiment of the present disclosure.

In still yet another circumstance, because the second PUCCH resource overlaps with the second HARQ-ACK, when the first HARQ-ACK and the CSI are transmitted in a multiplexed manner, the plurality of HARQ-ACKs overlap with each other. At this time, the CSI is directly dropped, so as to maintain the transmission of the original HARQ-ACK in a separate manner, as shown in FIG. 10.

In the embodiments of the present disclosure, the method is also applicable when the CSI is replaced with the SR. When the PUCCH format 1 is used by both the SR and the HARQ-ACK, such a concept as PUCCH resource set does not exist, and the second PUCCH resource is directly determined as an SR resource. Hence, there is no such a circumstance where the resource is reselected or the resource is selected from a resource set.

According to the transmission method in the embodiments of the present disclosure, when at least one PUCCH in the plurality of PUCCHs carrying the HARQ-ACK in one time unit overlaps with the PUCCH carrying the other UCI, it is able to ensure that the determined PUCCH resource for transmitting the pieces of UCI overlapping with each other in a multiplexed manner does not overlap with the PUCCH resource carrying the HARQ-ACK. Alternatively, when it is impossible to ensure that the determined PUCCH resource for transmitting the pieces of UCI overlapping with each other in a multiplexed manner does not overlap with the PUCCH resource carrying the HARQ-ACK, the other UCI is dropped. As a result, it is able to prevent the plurality of HARQ-ACKs, which should not have overlapped each other, from overlapping with each other when the at least one PUCCH in the plurality of PUCCHs carrying the HARQ-ACK overlaps with the PUCCH carrying the other UCI, thereby to support the transmission of the plurality of HARQ-ACKs in a TDM manner.

Figure 11:
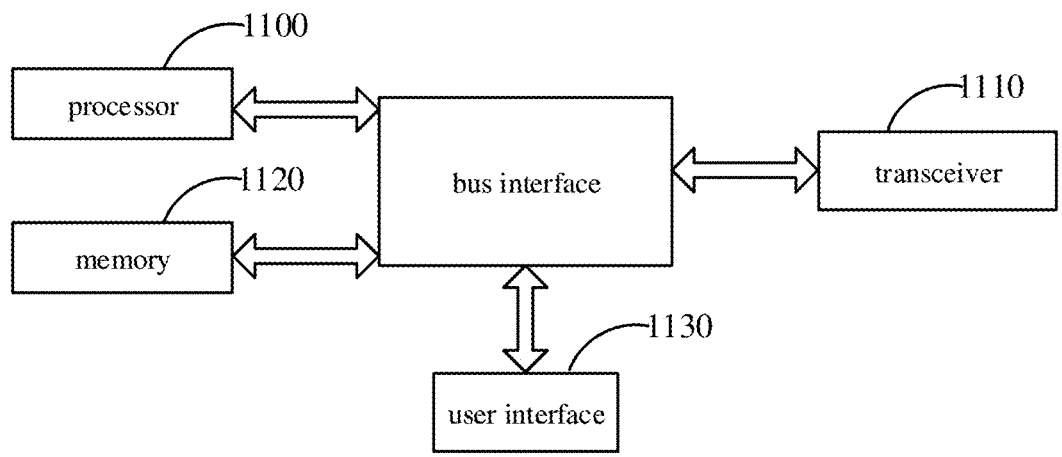
FIG. 11 is a block diagram of a terminal according to one embodiment of the present disclosure.

As shown in FIG. 11, the present disclosure further provides in some embodiments a terminal, which includes a transceiver, a memory, a processor, and a program stored in the memory and executed by the processor. The processor is configured to execute the program so as to: when at least one of at least two PUCCHs carrying an HARQ-ACK in one time unit overlaps with a PUCCH carrying target UCI in the time unit, determine a second PUCCH; and transmit target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, transmit the target information in accordance with a predetermined rule. The target information is the HARQ-ACK carried in the at least one PUCCH and the target UCI, or the HARQ-ACK carried in the at least one PUCCH.

In FIG. 11, bus architecture includes a quantity of buses and bridges connected to each other, so as to connect various circuits for one or more processors 1100 and one or more memories 1120. In addition, as is known in the art, the bus architecture is used to connect any other circuits, such as a circuit for a peripheral device, a circuit for a voltage stabilizer and a power management circuit, which are not particularly defined herein. A bus interface is provided, and the transceiver 1110 consists of a plurality of elements, i.e., a transmitter and a receiver for communication with any other devices over a transmission medium. With respect to different User Equipments (UEs), a user interface 1130 is also provided for devices which are to be arranged inside or outside the UE, and these devices include but not limited to a keypad, a display, a speaker, a microphone and a joystick. The processor 1100 takes charge of managing the bus architecture as well general processings, and the memory 1120 may store data therein for the operation of the processor 1100.

In a possible embodiment of the present disclosure, prior to transmitting the target information on the second PUCCH, the processor 1100 is further configured to execute the program, so as to, when the second PUCCH overlaps with the target PUCCH, determine that there is erroneous scheduling.

In a possible embodiment of the present disclosure, when transmitting the target information in accordance with the predetermined rule, the processor 1100 is further configured to execute the program, so as to: obtain the third PUCCH by removing symbols in the second PUCCH overlapping with the target PUCCH, or by shifting the second PUCCH forward or backward in a time domain with N symbols; and transmit the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

In a possible embodiment of the present disclosure, when transmitting the target information in accordance with the predetermined rule, the processor 1100 is further configured to execute the program, so as to: select a PUCCH not overlapping with the target PUCCH as a third PUCCH from a PUCCH resource set determined in accordance with a total quantity of bits of the target UCI and the HARQ-ACK carried in the at least one PUCCH; and transmit the target information on the third PUCCH.

In a possible embodiment of the present disclosure, the third PUCCH is a PUCCH having a minimum or maximum index and not overlapping with the target PUCCH within the PUCCH resource set; or the third PUCCH is a PUCCH within the PUCCH resource set not overlapping with the target PUCCH and located immediately before or after a PUCCH determined in accordance with a PUCCH resource indication field in DCI corresponding to the HARQ-ACK.

In a possible embodiment of the present disclosure, when transmitting the target information in accordance with the predetermined rule, the processor 1100 is further configured to execute the program, so as to: take a PUCCH resource in a target PUCCH resource set determined in accordance with a PUCCH resource indication field in DCI corresponding to the HARQ-ACK as a third PUCCH; and transmit the target information on the third PUCCH. The target PUCCH resource set is a set whose index is greater than or smaller than the PUCCH resource set determined in accordance with the total quantity of bits of the HARQ-ACK on the at least one PUCCH and the target UCI.

In a possible embodiment of the present disclosure, when transmitting the target information in accordance with the predetermined rule, the processor 1100 is further configured to execute the program, so as to drop the target UCI, and transmit the HARQ-ACK on the at least one PUCCH.

In a possible embodiment of the present disclosure, the target UCI is at least one of CSI and an SR.

In a possible embodiment of the present disclosure, when determining the second PUCCH, the processor 1100 is further configured to execute the program, so as to: determine one PUCCH resource set in accordance with the total quantity of bits of the HARQ-ACK on the at least one PUCCH and the target UCI, and determine one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determine a PUCCH corresponding to the SR as the second PUCCH; or when the target UCI is CSI and the HARQ-ACK carried in the at least one PUCCH is an HARQ-ACK for an SPS PDSCH, determine a PUCCH corresponding to the CSI as the second PUCCH.

In a possible embodiment of the present disclosure, when determining the second PUCCH, the processor 1100 is further configured to execute the program, so as to: determine whether the simultaneous transmission of the HARQ-ACK and the target UCI is supported; and in the case that the simultaneous transmission of the HARQ-ACK and the target UCI is supported, determine the second PUCCH.

According to the terminal in the embodiments of the present disclosure, when at least one of the at least two PUCCHs carrying the HARQ-ACK in one time unit overlaps with the PUCCH carrying the target UCI in the time unit, the second PUCCH is determined, and then the target information is transmitted on the second PUCCH. The second PUCCH does not overlap with the target PUCCH, the target PUCCH is a PUCCH carrying the HARQ-ACK other than the at least one PUCCH in the time unit. Alternatively, when the second PUCCH overlapping with the target PUCCH, the target information is transmitted in accordance with the predetermined rule. As a result, it is able to prevent a plurality of HARQ-ACKs, which should not have overlapped each other, from overlapping with each other, thereby to transmit the plurality of HARQ-ACKs in a TDM manner.

The present disclosure further provides in some embodiments a computer-readable storage medium storing therein a computer program. The program is executed by a processor so as to: when at least one of at least two PUCCHs carrying an HARQ-ACK in one time unit overlaps with a PUCCH carrying target UCI in the time unit, determine a second PUCCH; and transmit target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, transmit the target information in accordance with a predetermined rule. The target information is the HARQ-ACK carried in the at least one PUCCH and the target UCI, or the HARQ-ACK carried in the at least one PUCCH.

The program is executed by the processor so as to implement the above-mentioned transmission method for the terminal with a same technical effect, which will not be particularly defined herein.

Figure 12:
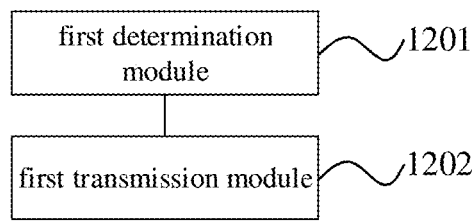
FIG. 12 is a schematic view showing modules of the terminal according to one embodiment of the present disclosure.

As shown in FIG. 12, the present disclosure further provides in some embodiments a terminal, which includes: a first determination module 1201 configured to, when at least one of at least two PUCCHs carrying an HARQ-ACK in one time unit overlaps with a PUCCH carrying target UCI in the time unit, determine a second PUCCH; and a first transmission module 1202 configured to transmit target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, transmit the target information in accordance with a predetermined rule. The target information is the HARQ-ACK carried in the at least one PUCCH and the target UCI, or the HARQ-ACK carried in the at least one PUCCH.

In a possible embodiment of the present disclosure, the terminal further includes a second determination module configured to, before the target information is transmitted by the first transmission module on the second PUCCH, when the second PUCCH overlaps with the target PUCCH, determine that there is erroneous scheduling.

In a possible embodiment of the present disclosure, when the first transmission module is used to transmit the target information in accordance with the target rule, the first transmission module includes: a first processing sub-module configured to obtain the third PUCCH by removing symbols in the second PUCCH overlapping with the target PUCCH, or by shifting the second PUCCH forward or backward in a time domain with N symbols; and a first transmission sub-module configured to transmit the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

In a possible embodiment of the present disclosure, when the first transmission module is used to transmit the target information in accordance with the predetermined rule, the first transmission module includes: a second processing sub-module configured to select a PUCCH not overlapping with the target PUCCH as a third PUCCH from a PUCCH resource set determined in accordance with a total quantity of bits of the target UCI and the HARQ-ACK carried in the at least one PUCCH; and a second transmission sub-module configured to transmit the target information on the third PUCCH.

In a possible embodiment of the present disclosure, the third PUCCH is a PUCCH having a minimum or maximum index and not overlapping with the target PUCCH within the PUCCH resource set; or the third PUCCH is a PUCCH within the PUCCH resource set not overlapping with the target PUCCH and located immediately before or after a PUCCH determined in accordance with a PUCCH resource indication field in DCI corresponding to the HARQ-ACK.

In a possible embodiment of the present disclosure, when the first transmission module is used to transmit the target information in accordance with the predetermined rule, the first transmission module includes: a third processing sub-module configured to take a PUCCH resource in a target PUCCH resource set determined in accordance with a PUCCH resource indication field in DCI corresponding to the HARQ-ACK as a third PUCCH; and a third transmission sub-module configured to transmit the target information on the third PUCCH. The target PUCCH resource set is a set whose index is greater than or smaller than the PUCCH resource set determined in accordance with the total quantity of bits of the HARQ-ACK on the at least one PUCCH and the target UCI.

In a possible embodiment of the present disclosure, when the first transmission module is used to transmit the target information in accordance with the predetermined rule, the first transmission module is configured to drop the target UCI, and transmit the HARQ-ACK on the at least one PUCCH.

In a possible embodiment of the present disclosure, the target UCI is at least one of CSI and an SR.

In a possible embodiment of the present disclosure, the first determination module is further configured to: determine one PUCCH resource set in accordance with the total quantity of bits of the HARQ-ACK on the at least one PUCCH and the target UCI, and determine one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determine a PUCCH corresponding to the SR as the second PUCCH; or when the target UCI is CSI and the HARQ-ACK carried in the at least one PUCCH is an HARQ-ACK for an SPS PDSCH, determine a PUCCH corresponding to the CSI as the second PUCCH.

In a possible embodiment of the present disclosure, the first determination module includes: a first determination sub-module configured to determine whether the simultaneous transmission of the HARQ-ACK and the target UCI is supported; and a second determination sub-module configured to, in the case that the simultaneous transmission of the HARQ-ACK and the target UCI is supported, determine the second PUCCH.

According to the terminal in the embodiments of the present disclosure, when at least one of the at least two PUCCHs carrying the HARQ-ACK in one time unit overlaps with the PUCCH carrying the target UCI in the time unit, the second PUCCH is determined, and then the target information is transmitted on the second PUCCH. The second PUCCH does not overlap with the target PUCCH, the target PUCCH is a PUCCH carrying the HARQ-ACK other than the at least one PUCCH in the time unit. Alternatively, when the second PUCCH overlapping with the target PUCCH, the target information is transmitted in accordance with the predetermined rule. As a result, it is able to prevent a plurality of HARQ-ACKs, which should not have overlapped each other, from overlapping with each other, thereby to transmit the plurality of HARQ-ACKs in a TDM manner.

Figure 13:
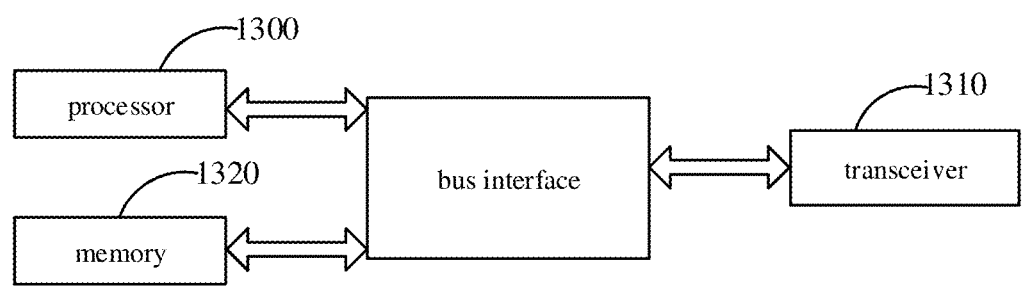
FIG. 13 is a block diagram of a network device according to one embodiment of the present disclosure.

As shown in FIG. 13, the present disclosure further provides in some embodiments a network device. The network device is a base station, and includes a memory 1320, a processor 1300, a transceiver 1310, a bus interface, and a computer program stored in the memory 1320 and executed by the processor 1300. The processor 1300 is configured to execute the program in the memory 1320 so as to: when at least one of at least two PUCCHs carrying an HARQ-ACK in one time unit overlaps with a PUCCH carrying target UCI in the time unit, determine a second PUCCH; and receive target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, receive the target information in accordance with a predetermined rule. The target information is the HARQ-ACK carried in the at least one PUCCH and the target UCI, or the HARQ-ACK carried in the at least one PUCCH.

In FIG. 13, bus architecture includes a number of buses and bridges connected to each other, so as to connect various circuits for one or more processors 1300 and one or more memories 1320. In addition, as is known in the art, the bus architecture is used to connect any other circuits, such as a circuit for a peripheral device, a circuit for a voltage stabilizer and a power management circuit. The bus interface is provided, and the transceiver 1310 may consist of a plurality of elements, i.e., a transmitter and a receiver for communication with any other devices over a transmission medium. The processor 1300 takes charge of managing the bus architecture as well as general processings. The memory 1320 stores therein data for the operation of the processor 1300.

In a possible embodiment of the present disclosure, prior to receiving the target information on the second PUCCH, the processor 1300 is further configured to execute the program, so as to, when the second PUCCH overlaps with the target PUCCH, determine that there is erroneous scheduling.

In a possible embodiment of the present disclosure, when receiving the target information in accordance with the predetermined rule, the processor 1300 is further configured to execute the program, so as to: obtain the third PUCCH by removing symbols in the second PUCCH overlapping with the target PUCCH, or by shifting the second PUCCH forward or backward in a time domain with N symbols; and receive the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

In a possible embodiment of the present disclosure, when receiving the target information in accordance with the predetermined rule, the processor 1300 is further configured to execute the program, so as to: select a PUCCH not overlapping with the target PUCCH as a third PUCCH from a PUCCH resource set determined in accordance with a total quantity of bits of the target UCI and the HARQ-ACK carried in the at least one PUCCH; and receive the target information on the third PUCCH.

In a possible embodiment of the present disclosure, the third PUCCH is a PUCCH having a minimum or maximum index and not overlapping with the target PUCCH within the PUCCH resource set; or the third PUCCH is a PUCCH within the PUCCH resource set not overlapping with the target PUCCH and located immediately before or after a PUCCH determined in accordance with a PUCCH resource indication field in DCI corresponding to the HARQ-ACK.

In a possible embodiment of the present disclosure, when receiving the target information in accordance with the predetermined rule, the processor 1300 is further configured to execute the program, so as to: take a PUCCH resource in a target PUCCH resource set determined in accordance with a PUCCH resource indication field in DCI corresponding to the HARQ-ACK as a third PUCCH; and receive the target information on the third PUCCH. The target PUCCH resource set is a set whose index is greater than or smaller than the PUCCH resource set determined in accordance with the total quantity of bits of the HARQ-ACK on the at least one PUCCH and the target UCI.

In a possible embodiment of the present disclosure, when receiving the target information in accordance with the predetermined rule, the processor 1300 is further configured to execute the program, so as to drop the target UCI, and receive the HARQ-ACK on the at least one PUCCH.

In a possible embodiment of the present disclosure, the target UCI is at least one of CSI and an SR.

In a possible embodiment of the present disclosure, when determining the second PUCCH, the processor 1300 is further configured to execute the program, so as to: determine one PUCCH resource set in accordance with the total quantity of bits of the HARQ-ACK on the at least one PUCCH and the target UCI, and determine one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determine a PUCCH corresponding to the SR as the second PUCCH; or when the target UCI is CSI and the HARQ-ACK carried in the at least one PUCCH is an HARQ-ACK for an SPS PDSCH, determine a PUCCH corresponding to the CSI as the second PUCCH.

In a possible embodiment of the present disclosure, when determining the second PUCCH, the processor 1300 is further configured to execute the program, so as to: determine whether the simultaneous transmission of the HARQ-ACK and the target UCI is supported; and in the case that the simultaneous transmission of the HARQ-ACK and the target UCI is supported, determine the second PUCCH.

According to the network device in the embodiments of the present disclosure, when at least one of the at least two PUCCHs carrying the HARQ-ACK in one time unit overlaps with the PUCCH carrying the target UCI in the time unit, the second PUCCH is determined, and then the target information is received on the second PUCCH. The second PUCCH does not overlap with the target PUCCH, the target PUCCH is a PUCCH carrying the HARQ-ACK other than the at least one PUCCH in the time unit. Alternatively, when the second PUCCH overlapping with the target PUCCH, the target information is received in accordance with the predetermined rule. As a result, it is able to prevent a plurality of HARQ-ACKs, which should not have overlapped each other, from overlapping with each other, thereby to transmit the plurality of HARQ-ACKs in a TDM manner.

The present disclosure further provides in some embodiments a computer-readable storage medium storing therein a computer program. The program is executed by a processor, so as to: when at least one of at least two PUCCHs carrying an HARQ-ACK in one time unit overlaps with a PUCCH carrying target UCI in the time unit, determine a second PUCCH; and receive target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, receive the target information in accordance with a predetermined rule. The target information is the HARQ-ACK carried in the at least one PUCCH and the target UCI, or the HARQ-ACK carried in the at least one PUCCH.

The program is executed by the processor so as to implement the above-mentioned transmission method for the network device with a same technical effect, which will not be particularly defined herein.

Figure 14:
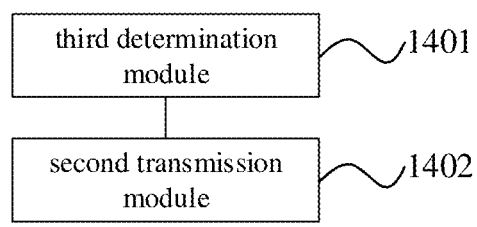
FIG. 14 is a schematic view showing modules of the network device according to one embodiment of the present disclosure.

As shown in FIG. 14, the present disclosure further provides in some embodiments a network device, which includes: a third determination module 1401 configured to, when at least one of at least two PUCCHs carrying an HARQ-ACK in one time unit overlaps with a PUCCH carrying target UCI in the time unit, determine a second PUCCH; and a second transmission module 1402 configured to, receive target information on the second PUCCH, the second PUCCH not overlapping with a target PUCCH, the target PUCCH being a PUCCH carrying the HARQ-ACK other than the at least one PUCCH in the time unit, or when the second PUCCH overlapping with the target PUCCH, receive the target information in accordance with a predetermined rule. The target information is the HARQ-ACK carried in the at least one PUCCH and the target UCI, or the HARQ-ACK carried in the at least one PUCCH.

In a possible embodiment of the present disclosure, the network device further includes a fourth determination module configured to, before the target information is received by the second transmission module on the second PUCCH, when the second PUCCH overlaps with the target PUCCH, determine that there is erroneous scheduling.

In a possible embodiment of the present disclosure, when the second transmission module is used to receive the target information in accordance with the predetermined rule, the second transmission module includes: a fourth processing sub-module configured to obtain a third PUCCH by removing symbols in the second PUCCH overlapping with the target PUCCH, or by shifting the second PUCCH forward or backward in a time domain with N symbols; and a first reception sub-module configured to receive the target information on the third PUCCH, where N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH.

In a possible embodiment of the present disclosure, when the second transmission module is configured to receive the target information in accordance with the predetermined rule, the second transmission module includes: a fifth processing sub-module configured to select a PUCCH not overlapping with the target PUCCH as a third PUCCH from a PUCCH resource set determined in accordance with a total quantity of bits of the target UCI and the HARQ-ACK carried in the at least one PUCCH; and a second reception sub-module configured to receive the target information on the third PUCCH.

In a possible embodiment of the present disclosure, the third PUCCH is a PUCCH having a minimum or maximum index and not overlapping with the target PUCCH within the PUCCH resource set; or the third PUCCH is a PUCCH within the PUCCH resource set not overlapping with the target PUCCH and located immediately before or after a PUCCH determined in accordance with a PUCCH resource indication field in DCI corresponding to the HARQ-ACK.

In a possible embodiment of the present disclosure, when the second transmission module is configured to receive the target information in accordance with the predetermined rule, the second transmission module includes: a sixth processing sub-module configured to take a PUCCH resource in a target PUCCH resource set determined in accordance with a PUCCH resource indication field in DCI corresponding to the HARQ-ACK as a third PUCCH; and a third receiving sub-module, configured to receive the target information on the third PUCCH. The target PUCCH resource set is a set whose index is greater than or smaller than the PUCCH resource set determined in accordance with the total quantity of bits of the HARQ-ACK on the at least one PUCCH and the target UCI.

In a possible embodiment of the present disclosure, when the second transmission module is used to receive the target information in accordance with the predetermined rule, the second transmission module is configured to drop the target UCI, and receive the HARQ-ACK on the at least one PUCCH.

In a possible embodiment of the present disclosure, the target UCI is at least one of CSI and an SR.

In a possible embodiment of the present disclosure, the third determination module is further configured to determine one PUCCH resource set in accordance with the total quantity of bits of the HARQ-ACK on the at least one PUCCH and the target UCI, and determine one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determine a PUCCH corresponding to the SR as the second PUCCH; or when the target UCI is CSI and the HARQ-ACK carried in the at least one PUCCH is an HARQ-ACK for an SPS PDSCH, determine a PUCCH corresponding to the CSI as the second PUCCH.

In a possible embodiment of the present disclosure, the third determination module includes: a third determination sub-module configured to determine whether the simultaneous transmission of the HARQ-ACK and the target UCI is supported; and a fourth determination sub-module configured to, in the case that the simultaneous transmission of the HARQ-ACK and the target UCI is supported, determine the second PUCCH.

According to the network device in the embodiments of the present disclosure, when at least one of the at least two PUCCHs carrying the HARQ-ACK in one time unit overlaps with the PUCCH carrying the target UCI in the time unit, the second PUCCH is determined, and then the target information is received on the second PUCCH. The second PUCCH does not overlap with the target PUCCH, the target PUCCH is a PUCCH carrying the HARQ-ACK other than the at least one PUCCH in the time unit. Alternatively, when the second PUCCH overlapping with the target PUCCH, the target information is received in accordance with the predetermined rule. As a result, it is able to prevent a plurality of HARQ-ACKs, which should not have overlapped each other, from overlapping with each other, thereby to transmit the plurality of HARQ-ACKs in a TDM manner.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP Device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

It should be further appreciated that, serial numbers of the steps shall not be used to define the order of the steps, and instead, the order of the steps shall be determined in accordance with their functions and internal logics.

The above embodiments are for illustrative purposes only, but the present disclosure is not limited thereto. Obviously, a person skilled in the art may make further modifications and improvements without departing from the spirit of the present disclosure, and these modifications and improvements shall also fall in the scope of the present disclosure.

What is claimed is:

1. A transmission method applied for a terminal, comprising:
   determining a second PUCCH when at least one of at least two Physical Uplink Control Channels (PUCCHs) carrying a Hybrid Automatic Repeat reQuest Acknowledgement (HARQ-ACK) in one time unit overlaps with a PUCCH carrying target Uplink Control Information (UCI) in the time unit, wherein the second PUCCH is configured to carry the HARQ-ACK carried in the at least one PUCCH and the target UCI; and
   transmitting target information on the second PUCCH when the second PUCCH does not overlap with a target PUCCH, or transmitting the target information in accordance with a predetermined rule when the second PUCCH overlaps with the target PUCCH,
   wherein the target PUCCH is a PUCCH among the at least two PUCCHs carrying the HARQ-ACK in the time unit other than the at least one PUCCH in the time unit;
   the target information is the HARQ-ACK carried in the at least one PUCCH and the target UCI, or the target information is the HARQ-ACK carried in the at least one PUCCH;
   the time unit is a slot or a mini-slot.

2. The transmission method according to claim 1, wherein the transmitting the target information in accordance with the predetermined rule when the second PUCCH overlaps with the target PUCCH comprises one of the following methods:
   method 1:
   obtaining a third PUCCH by removing symbols in the second PUCCH overlapping with the target PUCCH, or by shifting the second PUCCH forward or backward in a time domain with N symbols; and
   transmitting the target information on the third PUCCH, wherein N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH;
   method 2:
   selecting a PUCCH not overlapping with the target PUCCH as a third PUCCH from a PUCCH resource set determined in accordance with a total quantity of bits of the target UCI and the HARQ-ACK carried in the at least one PUCCH; and
   transmitting the target information on the third PUCCH;
   method 3:
   taking a PUCCH resource within a target PUCCH resource set determined in accordance with a PUCCH resource indication field in DCI corresponding to the HARQ-ACK as a third PUCCH; and
   transmitting the target information on the third PUCCH, wherein the target PUCCH resource set is a set whose index is greater than or smaller than the PUCCH resource set determined in accordance with the total quantity of bits of the HARQ-ACK on the at least one PUCCH and the target UCI,
   method 4:
   dropping the target UCI, and transmitting the HARQ-ACK on the at least one PUCCH.

3. The transmission method according to claim 2, wherein when the method 2 is adopted, the third PUCCH is one of the following:
   a PUCCH having a minimum or maximum index and not overlapping with the target PUCCH within the PUCCH resource set; or
   a PUCCH not overlapping with the target PUCCH and located immediately before or after a PUCCH determined in accordance with a PUCCH resource indication field in Downlink Control Information (DCI) corresponding to the HARQ-ACK within the PUCCH resource set.

4. The transmission method according to claim 1, wherein the target UCI is at least one of Channel State information (CSI) or a Scheduling Request (SR).

5. The transmission method according to claim 1, wherein the determining the second PUCCH comprises:
   determining one PUCCH resource set in accordance with the total quantity of bits of the HARQ-ACK on the at least one PUCCH and the target UCI, and determining one PUCCH resource within the determined PUCCH resource set as the second PUCCH in accordance with a PUCCH resource indication field in a last piece of DCI corresponding to the HARQ-ACK; or
   determining a PUCCH corresponding to the SR as the second PUCCH when the target UCI is an SR and a PUCCH format 1 is used by the at least one PUCCH and the SR; or
   determining a PUCCH corresponding to the CSI as the second PUCCH when the target UCI is CSI and the HARQ-ACK carried in the at least one PUCCH is an HARQ-ACK for a Semi-Persistent Scheduling (SPS) Physical Downlink Shared Channel (PDSCH); or determining whether the simultaneous transmission of the HARQ-ACK and the target UCI is supported; and in the case that the simultaneous transmission of the HARQ-ACK and the target UCI is supported, determining the second PUCCH.

6. A transmission method for a network device, comprising:

determining a second PUCCH when at least one of at least two Physical Uplink Control Channels (PUCCHs) carrying a Hybrid Automatic Repeat reQuest Acknowledgement (HARQ-ACK) in one time unit overlaps with a PUCCH carrying target Uplink Control Information (UCI) in the time unit, wherein the second PUCCH is configured to carry the HARQ-ACK carried in the at least one PUCCH and the target UCI; and receiving target information on the second PUCCH when the second PUCCH not overlapping with a target PUCCH, or when the second PUCCH overlapping with the target PUCCH, receiving the target information in accordance with a predetermined rule, wherein the target PUCCH is a PUCCH among the at least two PUCCHs carrying the HARQ-ACK in the time unit other than the at least one PUCCH in the time unit;

the target information is the HARQ-ACK carried in the at least one PUCCH and the target UCI, or the HARQ-ACK carried in the at least one PUCCH;

the time unit is a slot or a mini-slot.

7. The transmission method according to claim 6, wherein the receiving the target information in accordance with the predetermined rule when the second PUCCH overlapping with the target PUCCH comprises one of the following methods:

method 1:

obtaining a third PUCCH by removing symbols in the second PUCCH overlapping with the target PUCCH, or by shifting the second PUCCH forward or backward in a time domain with N symbols; and receiving the target information on the third PUCCH, wherein N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH, method 2:

selecting a PUCCH not overlapping with the target PUCCH as a third PUCCH from a PUCCH resource set determined in accordance with a total quantity of bits of the target UCI and the HARQ-ACK carried in the at least one PUCCH; and receiving the target information on the third PUCCH, method 3:

taking a PUCCH resource in a target PUCCH resource set determined in accordance with a PUCCH resource indication field in DCI corresponding to the HARQ-ACK as a third PUCCH; and receiving the target information on the third PUCCH, wherein the target PUCCH resource set is a set whose index is greater than or smaller than the PUCCH resource set determined in accordance with the total quantity of bits of the HARQ-ACK on the at least one PUCCH or the target UC, method 4:

dropping the target UCI, and receiving the HARQ-ACK on the at least one PUCCH.

8. The transmission method according to claim 7, wherein when the method 2 is adopted, the third PUCCH is one of the following:

a PUCCH having a minimum or maximum index and not overlapping with the target PUCCH within the PUCCH resource set; or a PUCCH within the PUCCH resource set not overlapping with the target PUCCH and located immediately before or after a PUCCH determined in accordance with a PUCCH resource indication field in Downlink Control Information (DCI) corresponding to the HARQ-ACK within the PUCCH resource set.

9. The transmission method according to claim 6, wherein the target UCI is at least one of Channel State information (CSI) or a Scheduling Request (SR).

10. The transmission method according to claim 6, wherein the determining the second PUCCH comprises:

determining one PUCCH resource set in accordance with the total quantity of bits of the HARQ-ACK on the at least one PUCCH and the target UCI, and determining one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determining a PUCCH corresponding to the SR as the second PUCCH; or when the target UCI is CSI and the HARQ-ACK carried in the at least one PUCCH is an HARQ-ACK for a Semi-Persistent Scheduling (SPS) Physical Downlink Shared Channel (PDSCH), determining a PUCCH corresponding to the CSI as the second PUCCH; or determining whether the simultaneous transmission of the HARQ-ACK and the target UCI is supported; and in the case that the simultaneous transmission of the HARQ-ACK and the target UCI is supported, determining the second PUCCH.

11. A terminal, comprising a transceiver, a memory, a processor, and a program stored in the memory and executed by the processor, wherein the processor is configured to execute the program so as to:

when at least one of at least two Physical Uplink Control Channels (PUCCHs) carrying a Hybrid Automatic Repeat reQuest Acknowledgement (HARQ-ACK) in one time unit overlaps with a PUCCH carrying target Uplink Control Information (UCI) in the time unit, determine a second PUCCH, wherein the second PUCCH is configured to carry the HARQ-ACK carried in the at least one PUCCH and the target UCI; and transmit target information on the second PUCCH, when the second PUCCH not overlapping with a target PUCCH, or when the second PUCCH overlapping with the target PUCCH, transmit the target information in accordance with a predetermined rule, wherein the target PUCCH is a PUCCH among the at least two PUCCHs carrying the HARQ-ACK in the time unit other than the at least one PUCCH in the time unit;

the target information is the HARQ-ACK carried in the at least one PUCCH and the target UCI, or the HARQ-ACK carried in the at least one PUCCH;

the time unit is a slot or a mini-slot.

12. The terminal according to claim 11, wherein when transmitting the target information in accordance with the predetermined rule, the processor is further configured to execute the program, so as to implement one of the following methods:

method 1:
obtaining a third PUCCH by removing symbols in the second PUCCH overlapping with the target PUCCH, or by shifting the second PUCCH forward or backward in a time domain with N symbols; and transmitting the target information on the third PUCCH, wherein N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH;

method 2:
selecting a PUCCH not overlapping with the target PUCCH as a third PUCCH from a PUCCH resource set determined in accordance with a total quantity of bits of the target UCI and the HARQ-ACK carried in the at least one PUCCH; and transmitting the target information on the third PUCCH;

method 3:
taking a PUCCH resource within a target PUCCH resource set determined in accordance with a PUCCH resource indication field in DCI corresponding to the HARQ-ACK as a third PUCCH; and transmitting the target information on the third PUCCH, wherein the target PUCCH resource set is a set whose index is greater than or smaller than the PUCCH resource set determined in accordance with the total quantity of bits of the HARQ-ACK on the at least one PUCCH and the target UCI, method 4:
dropping the target UCI, and transmitting the HARQ-ACK on the at least one PUCCH.

13. The terminal according to claim 12, wherein when the method 2 is adopted, the third PUCCH is one of the following:
a PUCCH having a minimum or maximum index and not overlapping with the target PUCCH within the PUCCH resource set; or
a PUCCH within the PUCCH resource set not overlapping with the target PUCCH and located immediately before or after a PUCCH determined in accordance with a PUCCH resource indication field in Downlink Control Information (DCI) corresponding to the HARQ-ACK within the PUCCH resource set.

14. The terminal according to claim 11, wherein the target UCI is at least one of Channel State information (CSI) or a Scheduling Request (SR).

15. The terminal according to claim 11, wherein when determining the second PUCCH, the processor is further configured to execute the program, so as to:
determine one PUCCH resource set in accordance with the total quantity of bits of the HARQ-ACK on the at least one PUCCH and the target UCI, and determine one PUCCH resource in the determined PUCCH resource set as the second PUCCH in accordance with a PUCCH resource indication field in a last piece of DCI corresponding to the HARQ-ACK; or
when the target UCI is an SR and a PUCCH format 1 is used by the at least one PUCCH and the SR, determine a PUCCH corresponding to the SR as the second PUCCH; or
when the target UCI is CSI and the HARQ-ACK carried in the at least one PUCCH is an HARQ-ACK for a Semi-Persistent Scheduling (SPS) Physical Downlink Shared Channel (PDSCH), determine a PUCCH corresponding to the CSI as the second PUCCH; or
when determining the second PUCCH, the processor is further configured to execute the program, so as to:
determine whether the simultaneous transmission of the HARQ-ACK and the target UCI is supported; and
in the case that the simultaneous transmission of the HARQ-ACK and the target UCI is supported, determine the second PUCCH.

16. A network device, comprising a transceiver, a memory, a processor, and a program stored in the memory and executed by the processor, wherein the processor is configured to execute the program so as to implement the transmission method according to claim 6.

17. The network device according to claim 16, wherein when receiving the target information in accordance with the predetermined rule, the processor is further configured to execute the program, so as to one of the following methods:
method 1:
obtaining a third PUCCH by removing symbols in the second PUCCH overlapping with the target PUCCH, or by shifting the second PUCCH forward or backward in a time domain with N symbols; and receiving the target information on the third PUCCH, wherein N represents the quantity of symbols in the second PUCCH overlapping with the target PUCCH, or the quantity of symbols from a first symbol in the second PUCCH to a last symbol in the second PUCCH that is overlapping with the target PUCCH, or the quantity of symbols from a last symbol in the second PUCCH to a first symbol in the second PUCCH that is overlapping with the target PUCCH, or the quantity of symbols from a first symbol in the target PUCCH to a last symbol in the target PUCCH that is overlapping with the second PUCCH, or the quantity of symbols from the last symbol in the target PUCCH to the first symbol in the target PUCCH that is overlapping with the second PUCCH, or the quantity of symbols from the first symbol in the second PUCCH to the last symbol in the target PUCCH, or the quantity of symbols from the last symbol in the second PUCCH to the first symbol in the target PUCCH, or the quantity of symbols from the last symbol in the second PUCCH to the first symbol in the target PUCCH, or the quantity of symbols from the first symbol in the second PUCCH to the last symbol in the target PUCCH, method 2:

selecting a PUCCH not overlapping with the target PUCCH as a third PUCCH from a PUCCH resource set determined in accordance with a total quantity of bits of the target UCI and the HARQ-ACK carried in the at least one PUCCH; and receiving the target information on the third PUCCH, method 3:

taking a PUCCH resource in a target PUCCH resource set determined in accordance with a PUCCH resource indication field in DCI corresponding to the HARQ-ACK as a third PUCCH; and receiving the target information on the third PUCCH, wherein the target PUCCH resource set is a set whose index is greater than or smaller than the PUCCH resource set determined in accordance with the total quantity of bits of the HARQ-ACK on the at least one PUCCH or the target UC, method 4:

dropping the target UCI, and receiving the HARQ-ACK on the at least one PUCCH.

18. The network device according to claim 17, wherein when the method 2 is adopted, the third PUCCH is one of the following:

a PUCCH having a minimum or maximum index and not overlapping with the target PUCCH within the PUCCH resource set; or a PUCCH within the PUCCH resource set not overlapping with the target PUCCH and located immediately before or after a PUCCH determined in accordance with a PUCCH resource indication field in Downlink Control Information (DCI) corresponding to the HARQ-ACK within the PUCCH resource set.

19. The network device according to claim 16, wherein the target UCI is at least one of Channel State information (CSI) or a Scheduling Request (SR).

20. The network device according to claim 16, wherein when determining the second PUCCH, the processor is further configured to execute the program, so as to:

determine one PUCCH resource set in accordance with the total quantity of bits of the HARQ-ACK on the at least one PUCCH and the target UCI, and determine one PUCCH resource in the determined PUCCH resource set as the second PUCCH in accordance with a PUCCH resource indication field in a last piece of DCI corresponding to the HARQ-ACK; or when the target UCI is an SR and a PUCCH format 1 is used by the at least one PUCCH and the SR, determine a PUCCH corresponding to the SR as the second PUCCH;

or when the target UCI is CSI and the HARQ-ACK carried in the at least one PUCCH is an HARQ-ACK for a Semi-Persistent Scheduling (SPS) Physical Downlink Shared Channel (PDSCH), determine a PUCCH corresponding to the CSI as the second PUCCH; or determine whether the simultaneous transmission of the HARQ-ACK and the target UCI is supported; and in the case that the simultaneous transmission of the HARQ-ACK and the target UCI is supported, determine the second PUCCH.

* * * * *